(12) United States Patent
Borigo et al.

(10) Patent No.: US 10,641,741 B2
(45) Date of Patent: May 5, 2020

(54) HIGH-TEMPERATURE MAGNETOSTRICTIVE GUIDED WAVE PIPE INSPECTION SYSTEM

(71) Applicant: FBS, Inc., Bellefonte, PA (US)

(72) Inventors: Cody J. Borigo, Port Matilda, PA (US); John C. McLaughlin, Bellefonte, PA (US); Steven E. Owens, Bellefonte, PA (US); Joseph L. Rose, State College, PA (US)

(73) Assignee: FBS, Inc., Bellefonte, PA (US)

( * ) Notice: Subject to any disclaimer, the term of this patent is extended or adjusted under 35 U.S.C. 154(b) by 206 days.

(21) Appl. No.: 15/879,747

(22) Filed: Jan. 25, 2018

(65) Prior Publication Data

US 2018/0217105 A1 Aug. 2, 2018

Related U.S. Application Data

(60) Provisional application No. 62/451,303, filed on Jan. 27, 2017.

(51) Int. Cl.
| | |
|---|---|
| *G01N 29/26* | (2006.01) |
| *G01N 29/04* | (2006.01) |
| *G01N 29/06* | (2006.01) |
| *G01N 29/34* | (2006.01) |
| *G01N 29/24* | (2006.01) |

(52) U.S. Cl.
CPC ....... *G01N 29/2412* (2013.01); *G01N 29/041* (2013.01); *G01N 29/069* (2013.01); *G01N 29/262* (2013.01); *G01N 29/348* (2013.01); *G01N 2291/0234* (2013.01); *G01N 2291/045* (2013.01); *G01N 2291/0425* (2013.01); *G01N 2291/2634* (2013.01)

(58) Field of Classification Search
CPC ............ G01N 29/2412; G01N 29/262; G01N 29/041; G01N 29/069; G01N 29/348; G01N 2291/2634; G01N 2291/0234; G01N 2291/0425; G01N 2291/045
USPC .......................................................... 73/642
See application file for complete search history.

(56) References Cited

U.S. PATENT DOCUMENTS

| | | | | |
|---|---|---|---|---|
| 5,598,995 | A * | 2/1997 | Meuth | E21B 17/1035 24/273 |
| 8,907,665 | B2 | 12/2014 | Rose et al. | |
| 9,169,078 | B2 * | 10/2015 | Petack | B65G 39/00 |
| 2014/0010614 | A1 * | 1/2014 | Tan | F16B 39/282 411/145 |
| 2016/0238564 | A1 * | 8/2016 | Owens | G01N 29/2412 |

* cited by examiner

*Primary Examiner* — Jacques M Saint Surin
(74) *Attorney, Agent, or Firm* — Duane Morris LLP

(57) ABSTRACT

A system for non-destructive inspection of a structure includes at least one magnetostrictive strip, a plurality of coil circuits, a jacket having at least one component layer, and a tensioner. The at least one magnetostrictive strip is configured to be induced with a bias magnetic field and be wrapped at least partially around an outer surface of the structure. The plurality of coil circuits are configured to be disposed adjacent to the at least one magnetostrictive strip, and the jacket is configured to be disposed adjacent to at least one of the plurality of coil circuits. The tensioner is configured to provide a mechanical pressure coupling between said at least one magnetostrictive strip and said structure. At least one of the plurality of coil circuits is individually controllable by a number of channels to at least one of excite or detect guided waves in said structure.

21 Claims, 23 Drawing Sheets

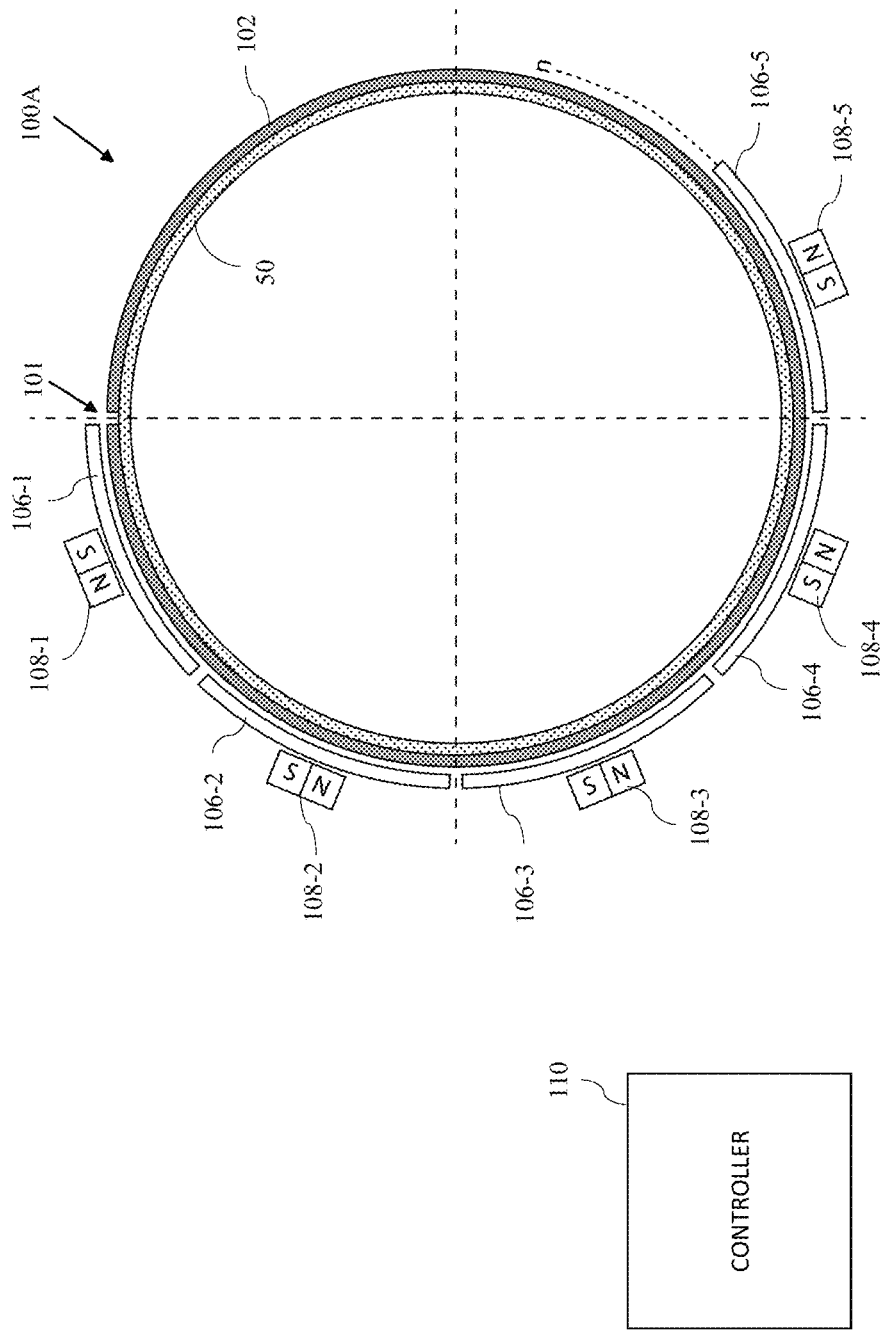

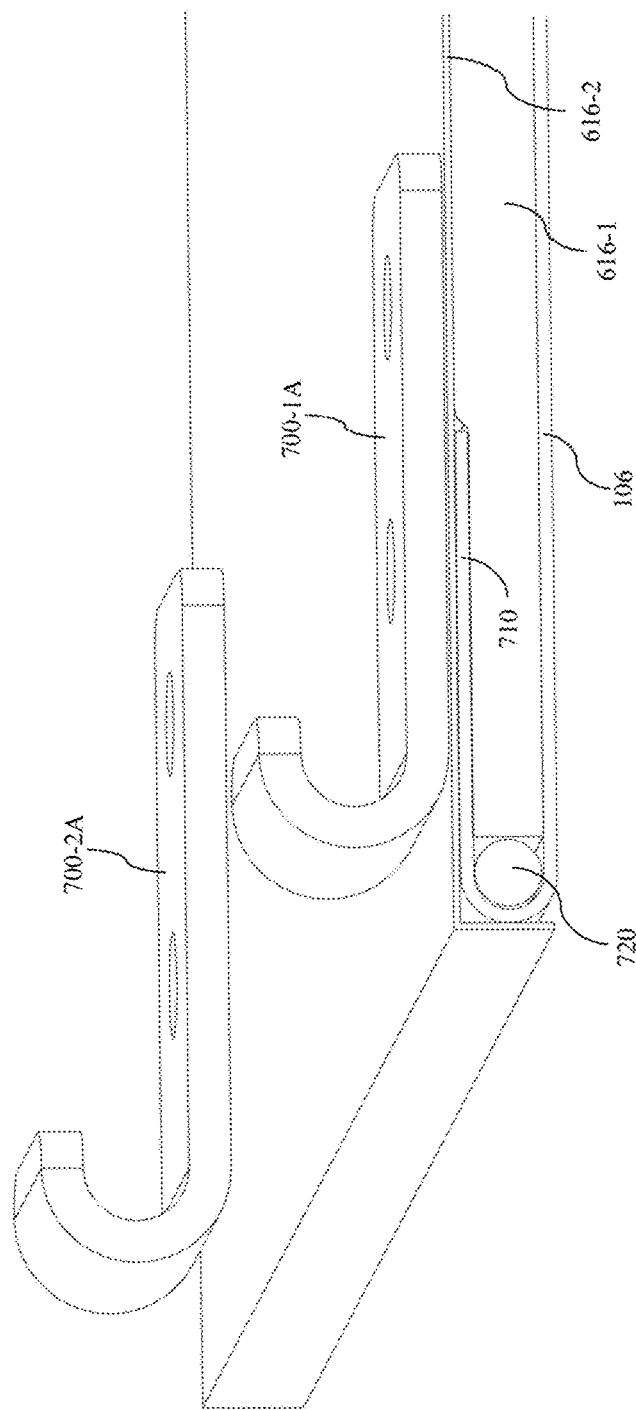

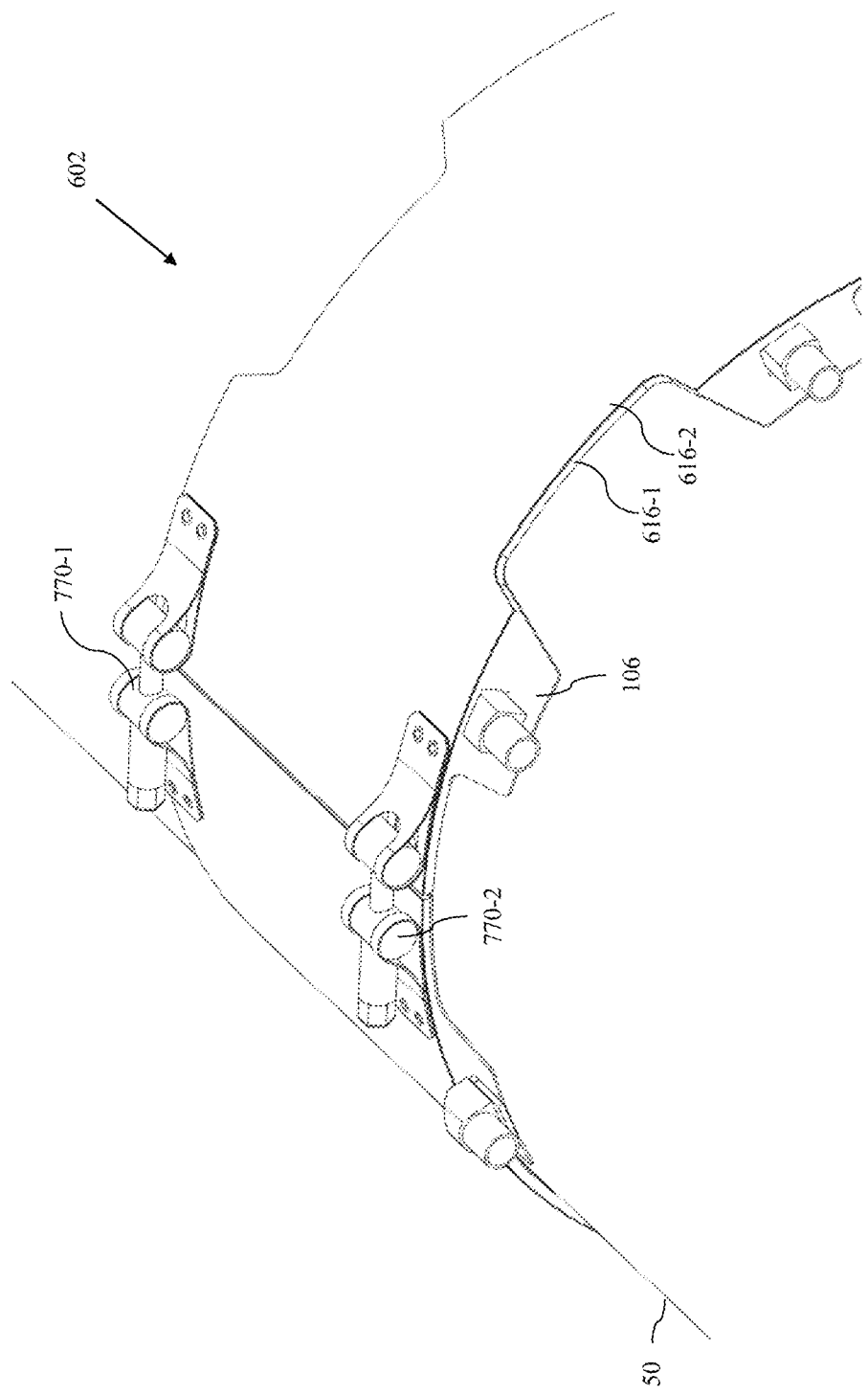

HIGH-TEMPERATURE MAGNETOSTRICTIVE GUIDED WAVE PIPE INSPECTION SYSTEM

CROSS-REFERENCE TO RELATED APPLICATIONS

This application claims priority to U.S. Provisional Patent Application No. 62/451,303, filed Jan. 27, 2017, the entirety of which is herein incorporated by reference.

FIELD OF DISCLOSURE

The disclosed systems and methods relate to non-destructive testing and structural health monitoring. More specifically, the disclosed systems and methods relate to structural heath monitoring and non-destructive examination of tubes, pipes, rods, and similar structures.

BACKGROUND

Non-destructive testing (NDT) and structural health monitoring (SHM) techniques are frequently used to test or inspect a material without causing damage. For example, such NDT/SHM techniques may be used to inspect welds or identify defects in pipes, airplane components, and other devices or materials in which maintaining the integrity of (i.e. not damaging) the device or material is desirable. For the purposes of the present technology, NDT refers to the non-invasive inspection of a structure or component, in which the evaluation of said structure or component is conducted on the data collected during the current inspection period and does not rely on comparison to previous data sets. Furthermore, for the purposes of the present disclosure, SHM refers to one of the permanent installation of a sensor for long-term monitoring of a structure or component or a method in which the evaluation of said structure or component relies on a comparison between data collected on said structure or component from an equivalent test location at a previous time.

Guided waves are a specific method for the NDT/SHM of structures or components in which low-frequency (generally <1 MHz) ultrasonic waves are introduced into the structure that subsequently interact with the local boundaries of the structure and form a coherent propagating wave packet that then follows the structure. Such boundaries may be the external surfaces of a particular material or the boundary may be an interface between two materials. The propagation characteristics of the wave packet are dictated by the cross-sectional dimensions and material properties of the structure. Unlike traditional ultrasonic waves that may be used to perform localized testing or inspection, guided waves may be used to perform remote testing or inspection of a material through various NDT/SHM techniques. In the pulse-echo guided wave technique, appurtenances, such as welds, structural attachments, cracks, or metal loss, reflect portions of the wave packet back toward the generating sensor where it is received by the generating sensor or by a separate receiving sensor and then amplified, digitized, processed, and displayed. These reflections may be analyzed to determine the extent of the abnormality or defect as well as the location of such abnormality or defect.

Ultrasonic guided wave techniques are utilized in a wide range of non-destructive inspection applications including those for pipes, plates, and shells comprised of metals, composites, and other materials. Long-range guided wave techniques are often utilized for the inspection of pipelines; technologies currently exist that utilize one of piezoelectric or magnetostrictive means. Some long-range guided wave testing technologies utilize a segmented collar design, in which at least one of the pulser/receiver sensors is divided into discrete segments around the circumference of the pipe. Segmentation allows the sound to be sent and received in a partial loading configuration around the circumference of the pipe. Partial receiving and, in some cases, partial loading, are used to perform both active and synthetic focusing of guided wave energy in the pipe to identify the axial and circumferential location and extent of reflectors. One example of a segmented long-range guided wave testing system that utilizes the magnetostrictive effect is disclosed in commonly assigned U.S. Pat. No. 8,907,665 B2, issued Dec. 9, 2014, entitled "MAGNETOSTRICTIVE SENSOR ARRAY FOR ACTIVE OR SYNTHETIC PHASED-ARRAY FOCUSING OF GUIDED WAVES," and which is incorporated by reference herein in its entirety.

The present disclosure describes enhanced long-range guided wave pipe inspection systems and methods utilizing segmented magnetostrictive collar technology described in U.S. Pat. No. 8,907,665 B2, which provide enhancements, such as enhanced ease of use, reduced cost, and a significantly extended operating temperature range.

SUMMARY

In some embodiments, a system for non-destructive inspection of a structure includes at least one magnetostrictive strip, a plurality of coil circuits, a jacket having at least one component layer, and a tensioner. The at least one magnetostrictive strip is configured to be induced with a bias magnetic field and be wrapped at least partially around an outer surface of the structure. The plurality of coil circuits are configured to be disposed adjacent to the at least one magnetostrictive strip, and the jacket is configured to be disposed adjacent to at least one of the plurality of coil circuits. The tensioner is configured to provide a mechanical pressure coupling between said at least one magnetostrictive strip and said structure. At least one of the plurality of coil circuits is individually controllable by a number of channels to at least one of excite or detect guided waves in said structure

BRIEF DESCRIPTION OF THE DRAWINGS

FIG. 1A illustrates one example of a segmented magnetostrictive inspection system in accordance with some embodiments.

FIG. 7C illustrates one end of one example of a magnetostrictive inspection system in accordance with some embodiments.

FIG. 7D illustrates one example of a magnetostrictive inspection system in which coupling pressure is applied by means of at least one threaded fastener in accordance with some embodiments.

DETAILED DESCRIPTION

Figure 1B:
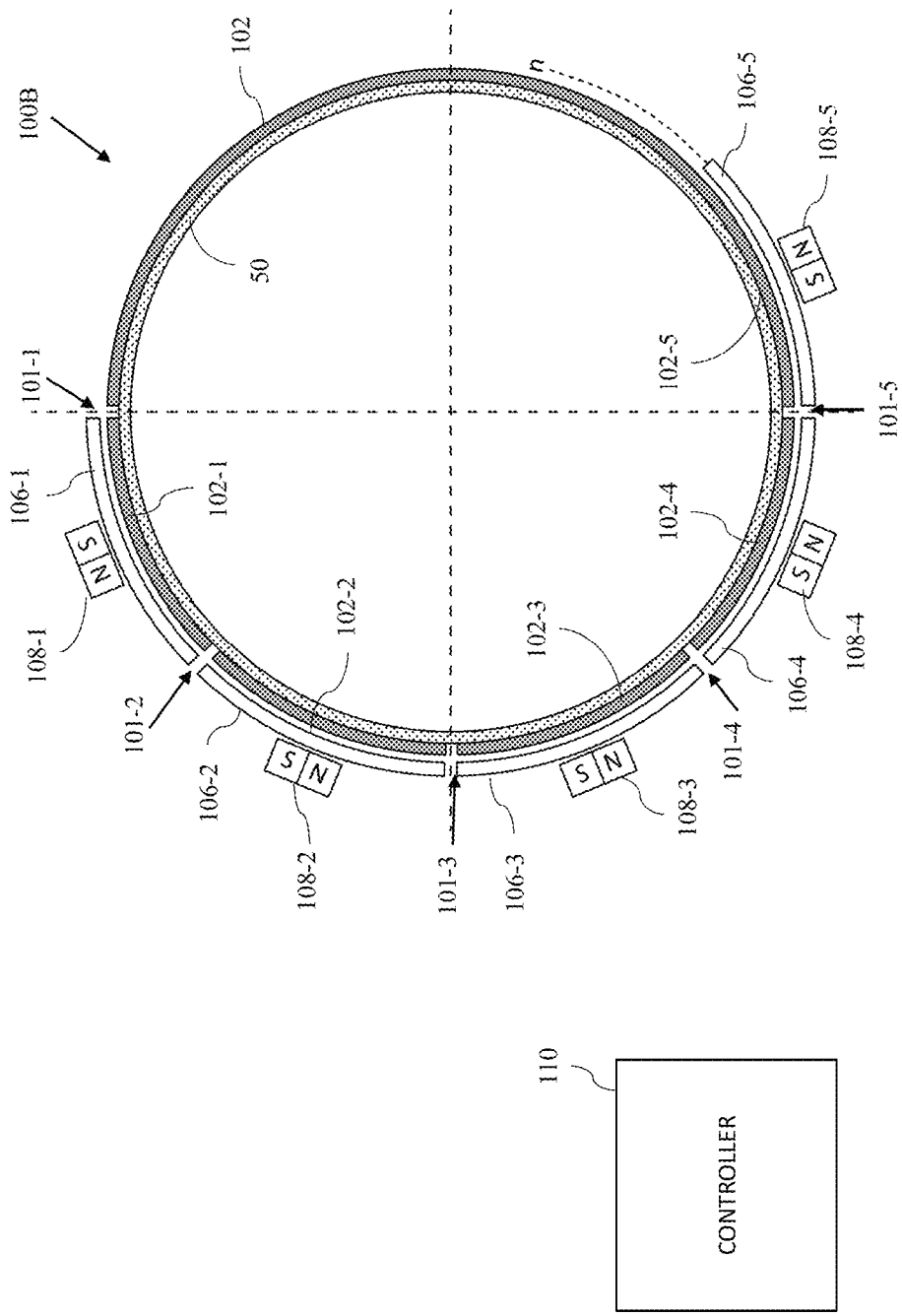
FIG. 1B illustrates another example of a segmented magnetostrictive inspection system in accordance with some embodiments.

This description of the exemplary embodiments is non-limiting and is intended to be read in connection with the accompanying drawings, which are to be considered part of the entire written description.

Guided waves are formed from the constructive interference of ultrasonic bulk waves that have interacted with the boundaries of the structure in which they propagate. Guided waves are unique in the sense that they are capable of propagating for long distances compared to traditional ultrasonic waves and can be used to inspect hidden/inaccessible structures like buried or cased piping and tubing. Unlike "spot-checking" with traditional ultrasonic techniques, guided waves provide at or near 100% volumetric inspection. Furthermore, guided waves provide an efficient and cost-effective means of inspection due to increased inspection speed and simplicity.

Various means of guided wave transduction exist including piezoelectric transducers, electromagnetic acoustic transducers (EMATs), impact devices, and magnetostrictive transducers. Magnetostrictive transducers have been utilized for the purposes of ultrasonic guided wave generation for many decades and have more recently been utilized for the purposes of long-range pipe inspection. Long-range guided wave pipe inspection systems can inspect pipelines over distances of up to several hundred feet in each direction from a fixed transducer collar location and have been implemented using various means.

For the purposes of the description, the term "pipe" refers to hollow cylinders including, but not limited to, structures such as pipes, tubes, cylinders, and cylindrical vessels. It is to be understood that the applications of the disclosed systems and methods can further include rods, multi-strand wires, and cylindrical structures with non-circular cross-section, including beams and rails.

For the purposes of the description, the term "torsional guided waves" refers to the class of torsional sonic/ultrasonic guided stress waves in hollow cylinders, which have predominantly in-plane displacement fields perpendicular to the wave propagation direction. This term encompasses axisymmetric T(0, n) and non-axisymmetric, i.e. flexural, T(m, n) modes in the torsional mode families of guided waves in hollow cylinders, in which n may be representative of any non-zero integers.

For the purposes of the description, the term "longitudinal guided waves" refers to the class of longitudinal sonic/ultrasonic guided stress waves in hollow cylinders, which have predominantly out-of-plane displacement fields and in-plane displacement fields parallel to the wave propagation direction. This term encompasses axisymmetric L(0, n) and non-axisymmetric, i.e. flexural, L(m, n) modes in the longitudinal mode families of guided waves in hollow cylinders, in which n may be representative of any non-zero integers.

For the purposes of the description, the term "axisymmetric guided wave" refers to guided wave energy that is generally uniform around the circumference of the pipe, e.g. the T(0, n) or L(0, n) modes. Although pure axisymmetric mode excitation may be impossible in practice due to imperfections in loading patterns and amplitudes around the circumference of said pipe, quasi-axisymmetric waves can be effectively considered to be axisymmetric when interpreting and processing the data, especially after these waves have propagated a short distance away from the excitation source. Axisymmetric or quasi-axisymmetric excitation on a pipe predominantly excites the axisymmetric modes in said pipe.

FIG. 1A illustrates one example of an improved system 100A for non-destructive testing or inspection utilizing magnetostriction. As shown in FIG. 1A, system 100A includes a magnetostrictive material 102 coupled to an object, or structure 50 to be tested. Magnetostrictive/ferromagnetic material 102 may wrap or extend entirely around or across or at least partially around or across a common surface of object under test 50. In embodiments in which magnetostrictive material 102 does not wrap or extend entirely around or across object 50, a gap 101 may be defined by magnetostrictive material 102 as shown in FIGS. 1A and 1B. Examples of magnetostrictive/ferromagnetic materials include, but are not limited to, iron, nickel, cobalt, alloys of any one or more of such materials, and other materials such as Terfenol-D and Galfenol. In some embodiments, test object 50 has a circular cross-sectional area having a perimeter length (e.g., a circumference) and a longitudinal length to define a cylinder.

An array 104 of two or more puller/receiver coil circuits 106-1, 106-2, . . . , 106-$n$ ("pulser/receiver coil circuits 106") are placed on, or within close proximity to, a surface of magnetostrictive/ferromagnetic material 102. The magnetostrictive/ferromagnetic material 102 is temporarily or permanently coupled to a surface of the structure/object being tested 50. The array of pulser/receiver coil circuits 106 may completely encircle/extend across or partially encircle/extend across testing/inspection object 50. Each pulser/receiver coil circuit 106 is configured to receive and transmit voltage/current information from/to a controller 110.

In some embodiments, such as the embodiment illustrated in FIG. 1B, the magnetostrictive material 102 may be segmented such that there is no connectivity between the portions of magnetostrictive material 102 that reside below each individual pulser/receiver coil circuit 106. As shown in FIG. 1B, a plurality of gaps 101-1, 101-2, . . . , 101-$(n-1)$ are defined between adjacent magnetostrictive material segments 102-1, 102-2, . . . , 100-$n$. Segmenting magnetostrictive material 102 reduces the generation of extraneous wave energy compared to embodiments in which magnetostrictive/ferromagnetic material 102 includes a single segment like in FIG. 1A.

In some embodiments, a single magnet or a plurality of magnets 108-1,108-2, . . . , 108-$n$ ("magnets 108"), which may be permanent magnets or non-permanent electromagnetic magnets (e.g. using an electromagnet, by a current-carrying wire wrapped around a ferromagnetic material, etc.), are placed within close proximity (e.g., less than or equal to one inch) to the magnetostrictive material and to each of the pulser/receiver coil circuits 106 such that the poles of each of the magnets 108 are directionally aligned. For example, and as illustrated in FIG. 1A, for the generation and reception of torsional guided wave energy, each of the magnets 108 are arranged such that as one circles magnetostrictive material in a clockwise direction the north pole of a magnet 108 is encountered first and the south pole of the magnet is encountered second. One of ordinary skill the in the art will understand that the position of the magnets may be switched such that the south pole of a magnet 108 is encountered first and the north pole of the same magnet 108 is encountered second as one moves clockwise around magnetostrictive material 102. Furthermore, one of ordinary skill in the art will realize that the polarity of the magnets can be rotated so as to generate and receive longitudinal guided wave energy. Furthermore, magnet(s) 108 may be removed from system 100 once a bias magnetic field is induced in ferromagnetic material 102.

Figure 2:
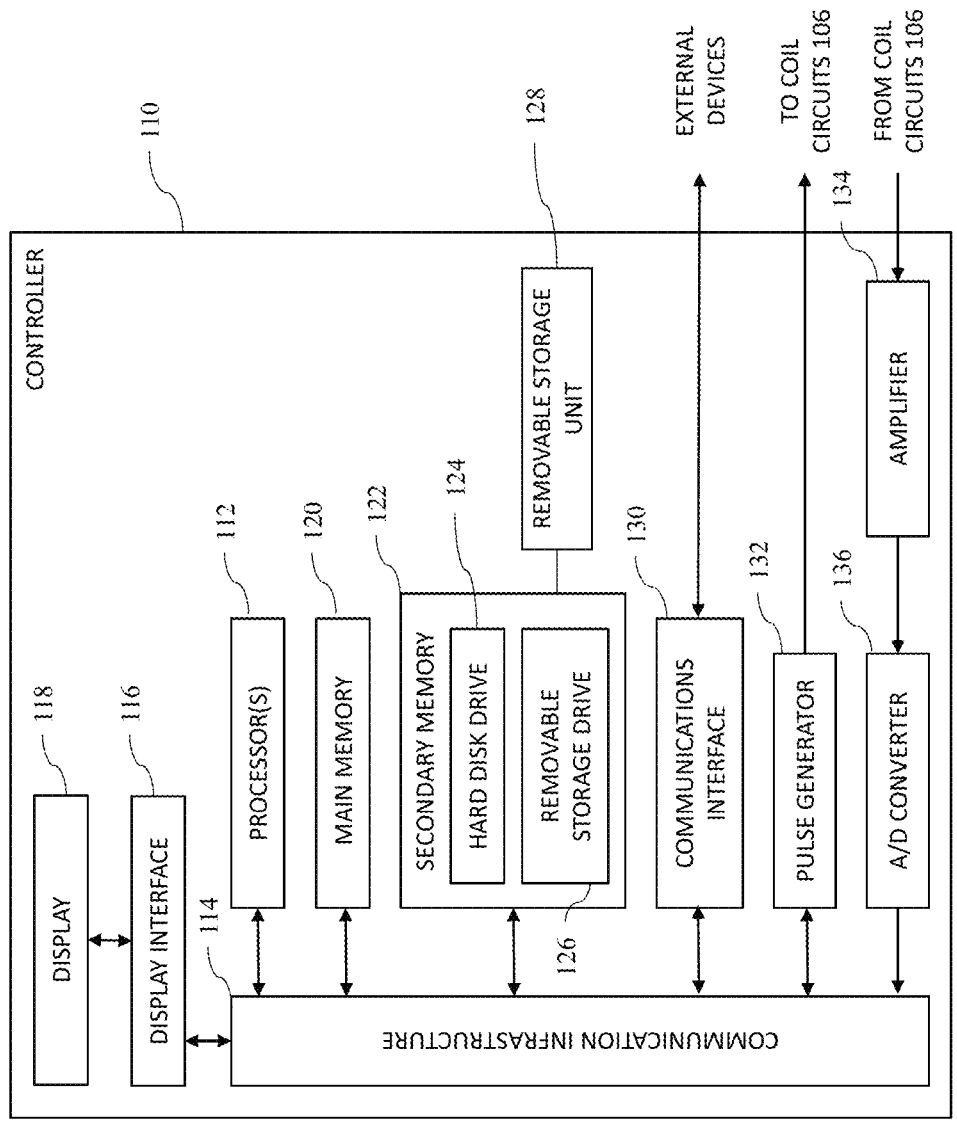
FIG. 2 illustrates one example of an architecture of a controller in accordance with the systems illustrated in FIGS. 1A and 1B.

As shown in FIGS. 1A and 1B, a controller 110 is in signal communication with each of the pulser/receiver coil circuits 106. FIG. 2 illustrates one example of an architecture of a controller 110. As shown in FIG. 2, controller 110 may include one or more processors, such as processor(s) 112. Processor(s) 112 may be any central processing unit ("CPU"), microprocessor, micro-controller, or computational device or circuit for executing instructions and be connected to a communication infrastructure 114 (e. g., a communications bus, cross-over bar, or network). Various software embodiments are described in terms of this exemplary controller 110. After reading this description, it will be apparent to one of ordinary skill in the art how to implement the method using other computer systems or architectures.

Controller 110 may include a display interface 116 that forwards graphics, text, and other data from the communication infrastructure 114 (or from a frame buffer not shown) for display on a monitor or display unit 118 that may be integrated with or separate from controller 110. Controller 110 also includes a main memory 120, such as a random-access memory ("RAM"), and may also include a secondary memory 122. Secondary memory 122 may include a more persistent memory such as, for example, a hard disk drive 124 and/or removable storage drive 126, representing an optical disk drive such as, for example, a DVD drive, a Blu-ray disc drive, or the like. In some embodiments, removable storage drive may be an interface for reading data from and writing data to a removable storage unit 128. Removable storage drive 126 reads from and/or writes to a removable storage unit 128 in a manner that is understood by one of ordinary skill in the art. Removable storage unit 128 represents an optical disc, a removable memory chip (such as an erasable programmable read only memory ("EPROM"), Flash memory, or the like), or a programmable read only memory ("PROM")) and associated socket, which may be read by and written to by removable storage drive 126. As will be understood by one of ordinary skill in the art, the removable storage unit 128 may include a computer usable storage medium having stored therein computer software and/or data.

Controller 110 may also include one or more communication interface(s) 130, which allows software and data to be transferred between controller 110 and external devices such as, for example, pulser/receiver circuit coils 106 and optionally to a mainframe, a server, or other device. Examples of the one or more communication interface(s) 130 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. Software and data transferred via communications interface 130 are in the form of signals, which may be electronic, electromagnetic, optical, or other signals capable of being received by communications interface 130. These signals are provided to communications interface(s) 130 via a communications path or channel. The channel may be implemented using wire or cable, fiber optics, a telephone line, a cellular link, a radio frequency ("RF") link, or other communication channels.

In this document, the terms "computer program medium" and "computer readable medium" refer to non-transitory media such as removable storage units 128, 130, or a hard disk installed in hard disk drive 124. These computer program products provide software to controller 110. Computer programs (also referred to as "computer control logic") may be stored in main memory 120 and/or secondary memory 122. Computer programs may also be received via communications interface(s) 130. Such computer programs, when executed by a processor(s) 112, enable the controller 110 to perform the features of the methods discussed herein.

In an embodiment where the methods are implemented using software, the software may be stored in a computer program product and loaded into controller 110 using removable storage drive 126, hard drive 124, or communications interface(s) 130. The software, when executed by a processor(s) 112, causes the processor(s) 112 to perform the functions of the methods described herein. In another embodiment, the method is implemented primarily in hardware using, for example, hardware components such as application specific integrated circuits ("ASICs"). Implementation of the hardware state machine so as to perform the functions described herein will be understood by persons of ordinary skill in the art. In yet another embodiment, the method is implemented using a combination of both hardware and software.

Controller 110 also includes a pulse generator 132 configured to output a variety of pulses to pulser/receiver coil circuits 106. For example, pulse generator 132 may transmit time-delayed control signals to coil circuits 106, and/or pulse generator 132 may transmit control signals of varying amplitudes to coils 106. As will be understood by one of ordinary skill in the art, each separately controllable channel must have a corresponding pulse generator 132 that is coupled to one or more coils 142 (FIGS. 3B-3D) or to one or more pulser/receiver coil circuits 106 for active focusing. An amplifier 134 is configured to amplify signals received from pulser/receiver coil circuits 106. Such signals received by coil circuits 106 include reflections of waves from structural features and other anomalies in test structure 50 in response to signals transmitted by pulse generator 132. An analog to digital ("A/D") converter 136 is coupled to an output of amplifier 134 and is configured to convert analog signals received from amplifier 134 to digital signals. The digital signals output from A/D converter 136 may be transmitted along communication infrastructure 114 where they may undergo further signal processing by processor(s) 112 as will be understood by one of ordinary skill in the art. For synthetic focusing, one of ordinary skill in the art will understand that a plurality of channels may be used in which each channel is coupled to a respective A/D converter 136, but each channel does not need to be connected to a respective pulse generator as in active focusing. One of ordinary skill in the art will understand that systems 100A, 100B may be configured to perform both active and synthetic focusing.

Figure 3A:
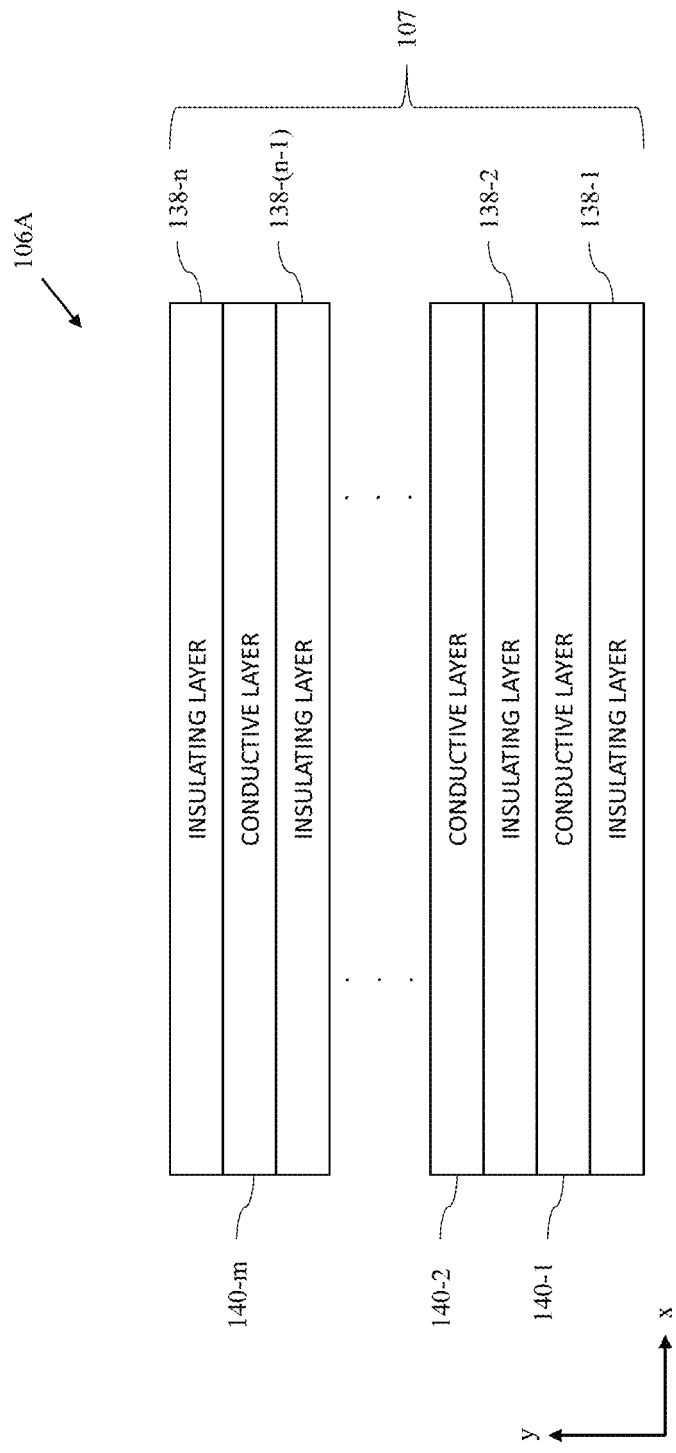
FIG. 3A is a cross-sectional side view of one example of a pulser/receiver coil circuit in accordance with the segmented magnetostriction inspection systems illustrated in FIGS. 1A and 1B.

One example of a pulser/receiver coil circuit 106 is illustrated in FIGS. 3A-3D. FIG. 3A is a cross-sectional view a pulser/receiver coil circuit 106A formed in a circuit board 107, which includes a plurality of insulating layers 138-1, 138-2, . . . , 138-n ("insulating layers 138") and a plurality of conductive layers 140-1, 140-2, . . . , 140-m ("conductive layers 140") stacked in the y-direction in an alternating manner. Insulating layers 138 and conductive layers 140 form a printed circuit board ("PCB"). In some embodiments, the PCB is a flexible PCB and insulating layers 138 are formed from a polyimide, silicone, or other flexible insulating material, and conductive layers 140 are formed from copper or another conductive material.

Figure 3B:
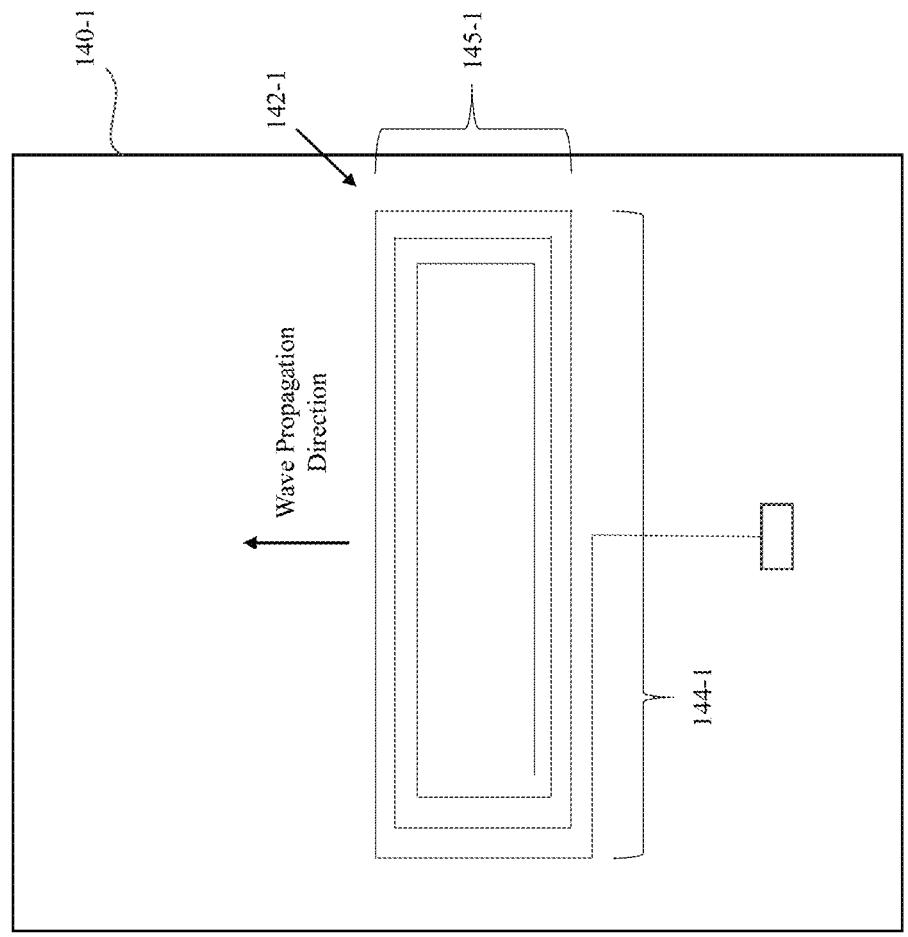
FIG. 3B is a plan view of a coil in a single conductive layer of a pulser/receiver coil circuit in accordance with some embodiments.
Figure 3C:
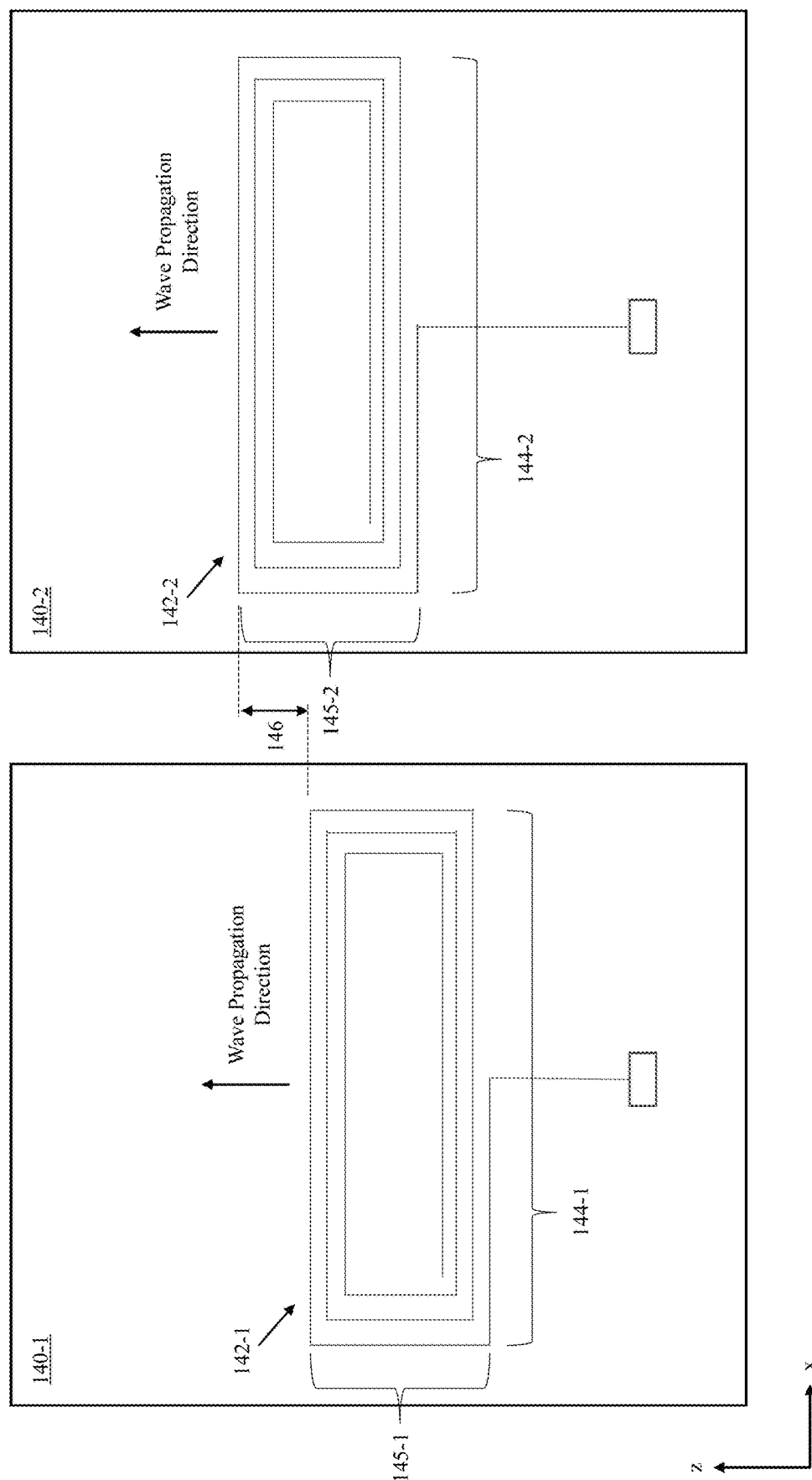
FIG. 3C includes side-by-side plan views of first and second coils each positioned in a respective conductive layer in accordance with some embodiments.
Figure 3D:
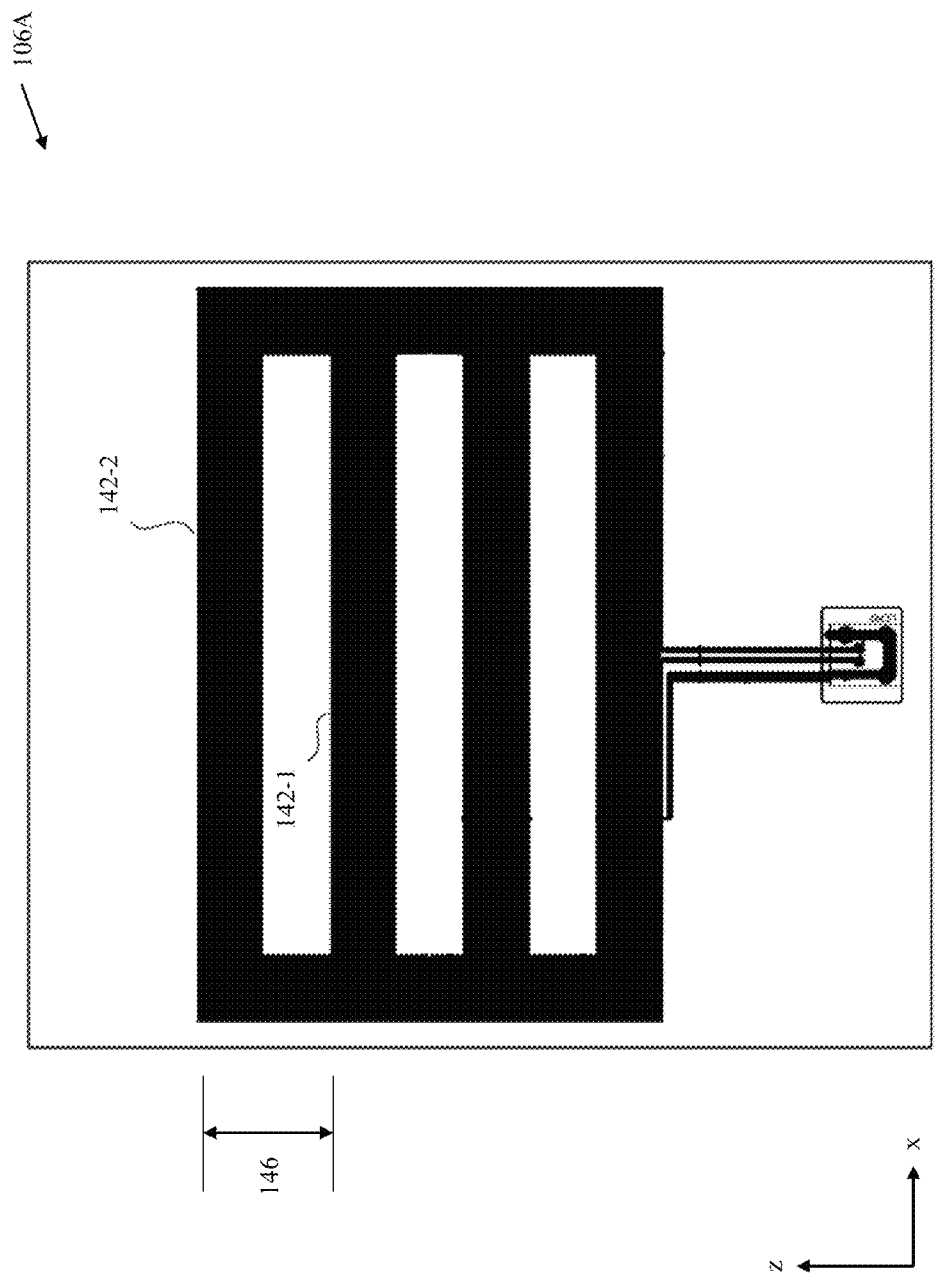
FIG. 3D is a plan view of the coils shown in FIG. 3C in two stacked conductive layers of a first pulser/receiver coil circuit in accordance with some embodiments.

Each conductive layer 140 may include one or more coils 142 (comprising a loop of conductive material, such as copper as shown in FIGS. 3B-3D) for producing a dynamic magnetic field in the magnetostrictive/ferromagnetic material in response to signals received from controller 110.

FIG. 3B illustrates one example of a plan view of a first coil 142-1 formed in a single conductive layer, e.g., conductive layer 140-1, of a multi-layer circuit board 107. Coil 142-1 may include a number of closely-spaced narrow traces that are arranged in a spiral configuration such that the overall coil 142-1 has a generally rectangular shape as illustrated in FIG. 3B. Coil 142-1—is configured to generate a wave that propagates in the z-direction with the coil 142-1 having an active area 144-1 along its length that extends perpendicular to a direction in which the generated wave propagates (e.g., in the x-direction). The portions of coil 142-1 that extend parallel to the direction of propagation of the propagating waves, i.e., those portions of coil 142-1 that extend parallel to the z-direction, may be referred to as the ineffective area 145-1 of coil 142-1.

As noted above, each conductive layer 140 of the multi-layer circuit board 107 may include a respective coil 142. The coils 142 formed in the different conductive layers 140 may be offset from one another in the z-direction. For example, FIG. 3C is a plan view of a first coil, e.g., coil 142-1, formed in a first conductive layer, e.g., conductive layer 140-1, disposed adjacent to a second coil, e.g., coil 142-2, formed in a second conductive layer, e.g., conductive layer 140-2. FIG. 3D is a plan view of the circuit 106 shown in FIG. 3C where the coils 142-1, 142-2 are simplified and shown as large, solid lines. As shown in FIGS. 3C and 3D, coil 142-1 in the first conductive layer 140-1 is offset in the z-direction relative to coil 142-2 formed in the second conductive layer 140-2 (or vice versa) as indicated by reference numeral 146. The coils 142-1, 142-2 in the different conductive layers 140-1, 140-2 are conductively isolated from one another by an intervening insulating layer, such as insulating layer 138-2 shown in FIG. 3A. Offsetting the active areas 144-1, 144-2 of coils 142-1, 142-2 enables a wave to be generated in a single direction (e.g., towards the bottom of the page in FIGS. 3C and 3D) as the wave propagating in the opposite direction (e.g., towards the top of the page in FIGS. 3C and 3D) is canceled (through destructive interference) due to the offset and the manner in which the control signals received from controller 110 actuate coils 142-1, 142-2 as will be understood by those of ordinary skill in the art.

Figure 3E:
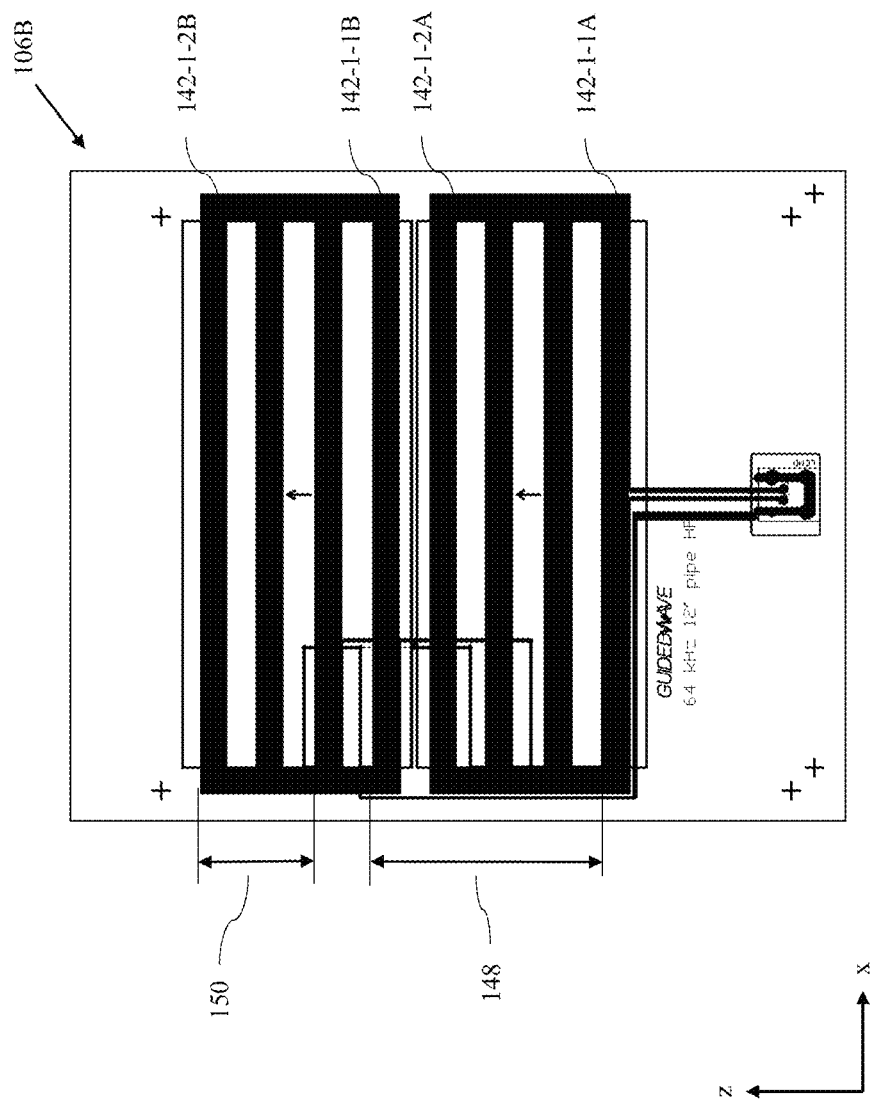
FIG. 3E is a plan view of one example of coils in two stacked conductive layers of a second pulser/receiver coil circuit comprised of two subsets of coils in accordance with some embodiments.

As described above, the number of conductive layers 140 that include coil(s) 142 may be varied. For example, FIG. 3E illustrates an example of a coil circuit 106B that is comprised of two subsets of coils 142, denoted by the letters "A" and "B" for the first and second coil subsets, respectively. The coil segments 142-1-1A and 142-1-2A are offset in the z-direction from their respective pairs 142-1-1B and 142-1-2B, respectively be a distance denoted by reference numeral 148. Note that the addition of multiple subsets of coils can be advantageous in increasing the signal amplitude and sensitivity of the sensor system. The offset in the z-direction of the upper and lower active areas of coil 142-1-2B is denoted by reference numeral 150 and is common for all individual coil segments. The offset 150 is equal to ½ the offset denoted by 148. Furthermore, the offset 146 denoted in FIG. 3C is equal to ¼ of offset 148. The magnetostrictive coil 106B will most effectively generate and receive guided waves with a wavelength equal to 148 in this configuration; thus, the center of the wavelength spectrum of the guided waves generated by said coil circuit 106B can be controlled by adjusting offsets 148, 150, and 146 accordingly. It will be obvious to those of ordinary skill in the art that said wavelength spectrum can be converted into an equivalent frequency spectrum for excitation of a guided wave mode with a known phase velocity.

Figure 3F:
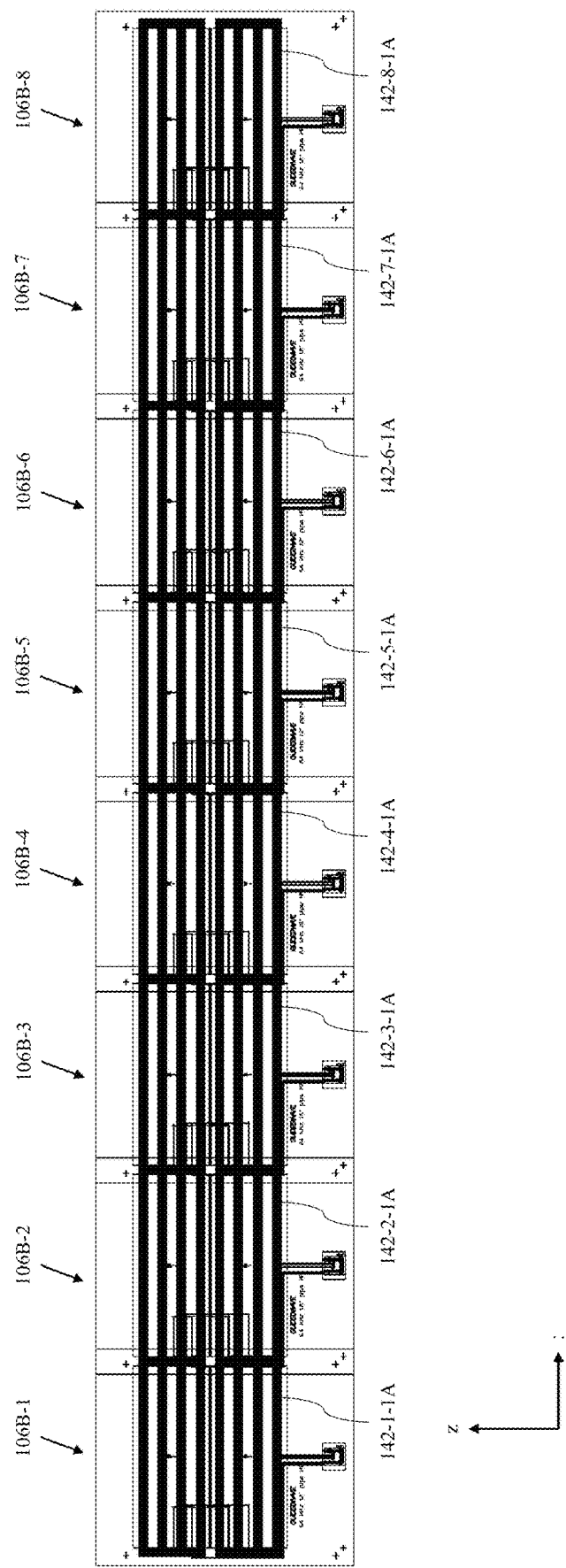
FIG. 3F is a plan view of one example of a plurality of coils aligned to form a coil assembly in accordance with some embodiments.

FIG. 3F illustrates an example of a plurality of coil circuits 106B-1 through 106-8 are aligned in the x-direction and assembled to form a larger coil assembly or array. Although eight coil circuits 106B are illustrated, one of ordinary skill in the art will understand that fewer or more coil circuits can be implemented in the array. In additional embodiments, the coil assembly illustrated in FIG. 3F could be formed by printing multiple segments on a single circuit board with four or more layers. One of ordinary skill in the art will understand that the pulser/receiver coil circuits 106 may have its coils 142 disposed in a wide variety of manners and not merely the manner as described above with respect to FIG. 3F.

Stacking the ineffective areas of coils 142 as illustrated in FIG. 3F such that the ineffective areas 145 (not shown in FIG. 3F) of coils 142 are minimized, enables a greater area of ferromagnetic material to be utilized for generating wave energy for performing non-destructive testing. Additionally, the stacking arrangement illustrated in FIG. 3F reduces the amount of undesirable wave energy transferred into the object under test 50, such as that generated in the ineffective areas of the coils 142. Further reduction in the amount of undesirable wave energy transferred into the object under test 50 may be accomplished by removing the magnetostrictive/ferromagnetic material from under the ineffective areas of the coils 142 while aligning the active areas 144 of the coils 142 such that the active areas 144 are disposed over the magnetostrictive/ferromagnetic material 102.

In some embodiments, each pulser/receiver coil circuit 106, which may include one or more coil(s) 142 disposed in a single conductive layer, may correspond to a single channel such that all the coils 142 of a single pulser/receiver coil circuit 106 are coupled to a single pulse generator 132 and/or a single A/D converter 136. In some embodiments, a single pulser/receiver coil circuit 106, which has coils 142 disposed in a plurality of layers 140, may be controlled by a plurality of channels as some of the coils 142 may correspond to a first channel (e. g., driven by a respective pulse generator 132 and/or coupled to a respective A/D converter 136) and the other coils 142 of the same pulser/receiver coil circuit 106 may correspond to a second channel (e.g., driven by a respective pulse generator 132 and/or coupled to a respective A/D converter 136).

Figure 4:
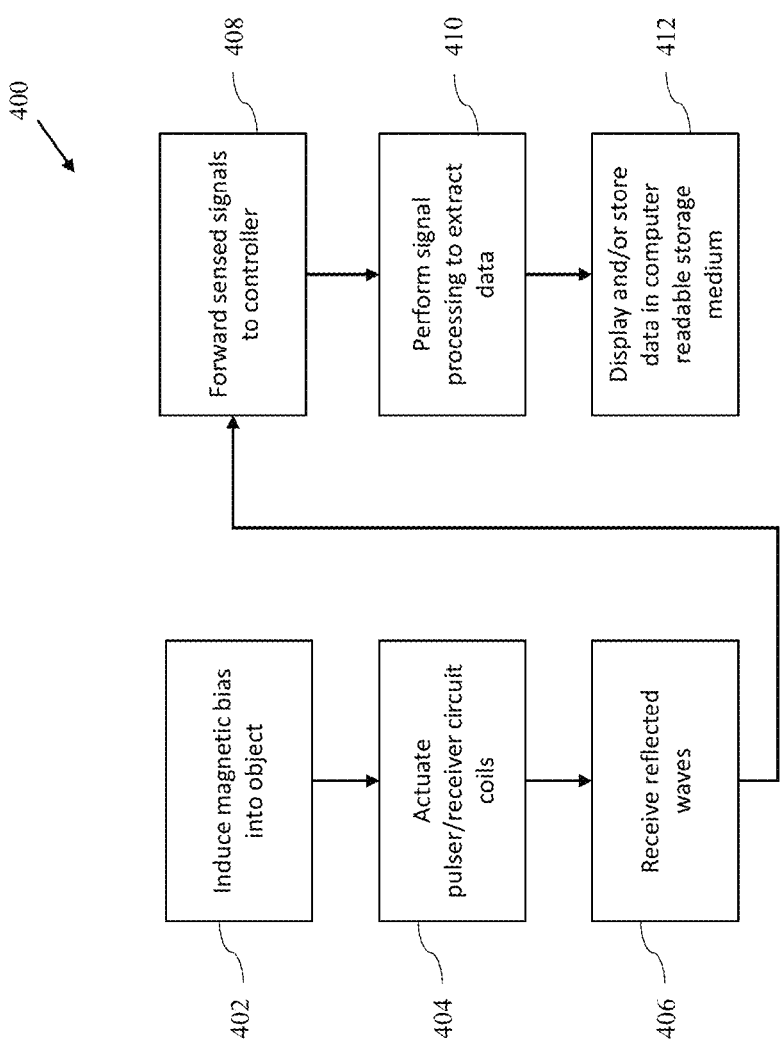
FIG. 4 is a flow diagram of one example of a method of performing non-destructive testing using the magnetostriction inspection system illustrated in FIGS. 1A and 1B in accordance with some embodiments.

The operation of systems 100A, 100B is described with reference to FIG. 4, which is a flow diagram of one example of a method 400 of magnetostrictive inspection/detection. As shown in FIG. 4, a magnetic bias is induced in magnetostrictive/ferromagnetic material 102 at block 402. The magnetic bias is induced by magnets 108 that are disposed adjacent to a magnetostrictive material 102 such that their respective poles are directionally aligned such that a pole of a first type (e.g., a north pole) of a first magnet 108 is disposed adjacent to a pole of a second type that is opposite the first type (e.g., a south pole) of a second magnet that is disposed directly adjacent to the first magnet.

At block 404, one or more pulser/receiver coil circuits 106 are individually actuated by controller 110 to generate one or more guided waves in object 50. In some embodiments, controller 110 transmits time-delayed and/or amplitude controlled signals to each pulser/receiver circuit coil 106, which each alter the bias magnetic field in response thereby generating dimensional fluctuations in the magnetostrictive material 102 that is coupled to the object under test 50, resulting in the generation of guided waves in the object under test 50. The time-delayed and/or varying amplitude control signals may be transmitted to coils 106 from pulse generator 132 of controller 110.

By properly phasing the excitation of the pulser/receiver circuit coils 106, guided wave energy can be made to constructively interfere at a predetermined location within object 50. The phasing can either be completed during excitation as described in the article "Angular-profile tuning of guided waves in hollow cylinders using a circumferential phased array" by Li et al. or via post-processing of the received data as described in the article "Defect imaging with guided waves in a pipe" by Hayashi et al. or as described in the article "Pipe inspection with guided wave synthetic focusing techniques" by Mu et al., the entireties of which are herein incorporated by reference. In embodiments in which object 50 has a non-cylindrical geometry, such as, for example, a plate, an active or synthetic phased-array for plate and plate-like structures using Lamb or horizontal shear guided waves may be generated in object 50 as described in the article "Ultrasonic guided wave imaging techniques in structural health monitoring" by Yan et al., the entirety of which is herein incorporated by reference.

At block 406, pulser/receiver circuit coils 106 receive a reflected guided wave from structural features and/or other anomalies such as metal loss in object 50. As will be obvious to one of ordinary skill in the art, guided wave energy may be sensed by pulser/receiver coil circuits 106. The guided wave energy sensed by puller/receiver coil circuits 106 are forwarded to controller 110 at block 408. The sensed guided wave energy may be received at amplifier 134 of controller 110 where amplifier 134 amplifies the received signals.

The amplified signals output of amplifier 134 are received at A/D converter 136. A/D converter 136 digitizes the amplified signals it receives from amplifier 134 and outputs the digitized signals to communication infrastructure 114 where they are forwarded for further signal processing.

At block 410, the sensed signals undergo signal processing to extract relevant data. For example, the received signals may be processed to identify if any defects or irregularities are present in object 50. For example, the time-delays and/or amplitude controls are applied to the signals received by the pulser/receiver coil circuits 106 to artificially reconstruct the constructive interference of the excited guided waves at a specific location along the axis and circumference of the object 50.

At block 412, controller 110 may store the extracted data in a computer readable storage medium such as main memory 120 and/or secondary memory 122. Additionally, or alternatively, the extracted data may be processed and displayed to a user on display 118 of controller 110.

Figure 5A:
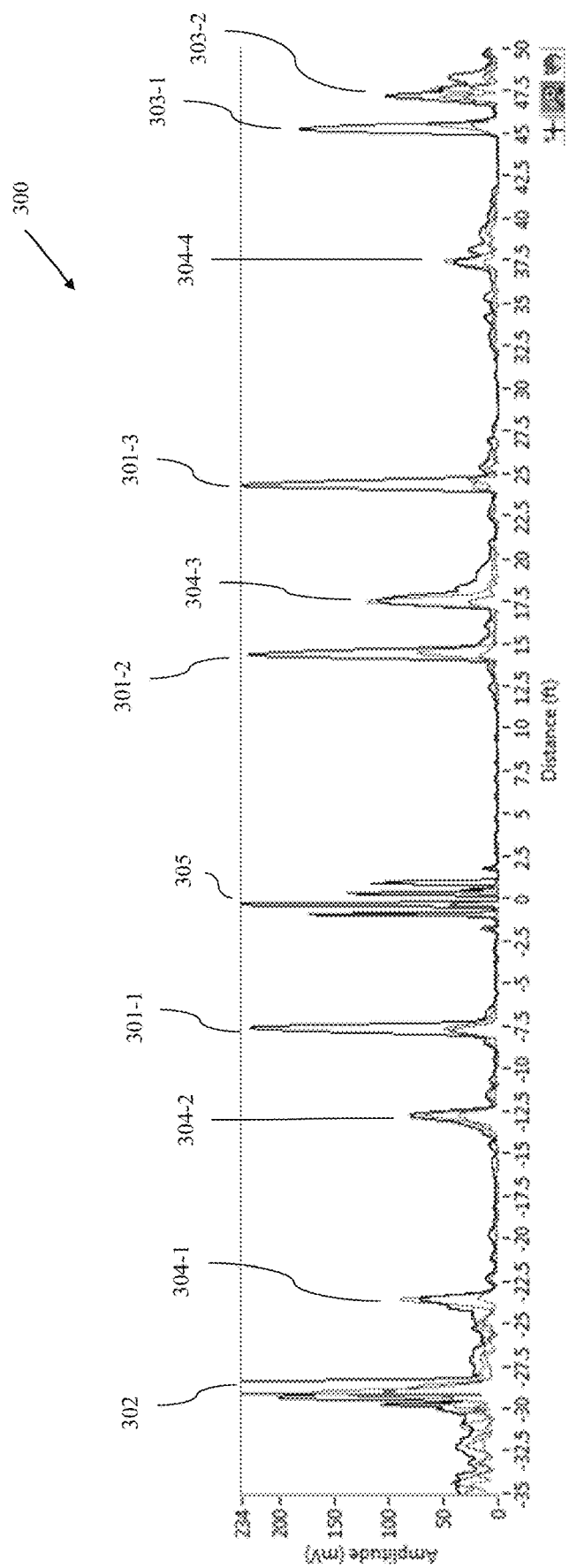
FIG. 5A is one example of a one-dimensional A-scan image of an 80'-long 8" pipe loop generated with the magnetostriction inspection system illustrated in FIGS. 1A and 1B in accordance with some embodiments.
Figure 5B:
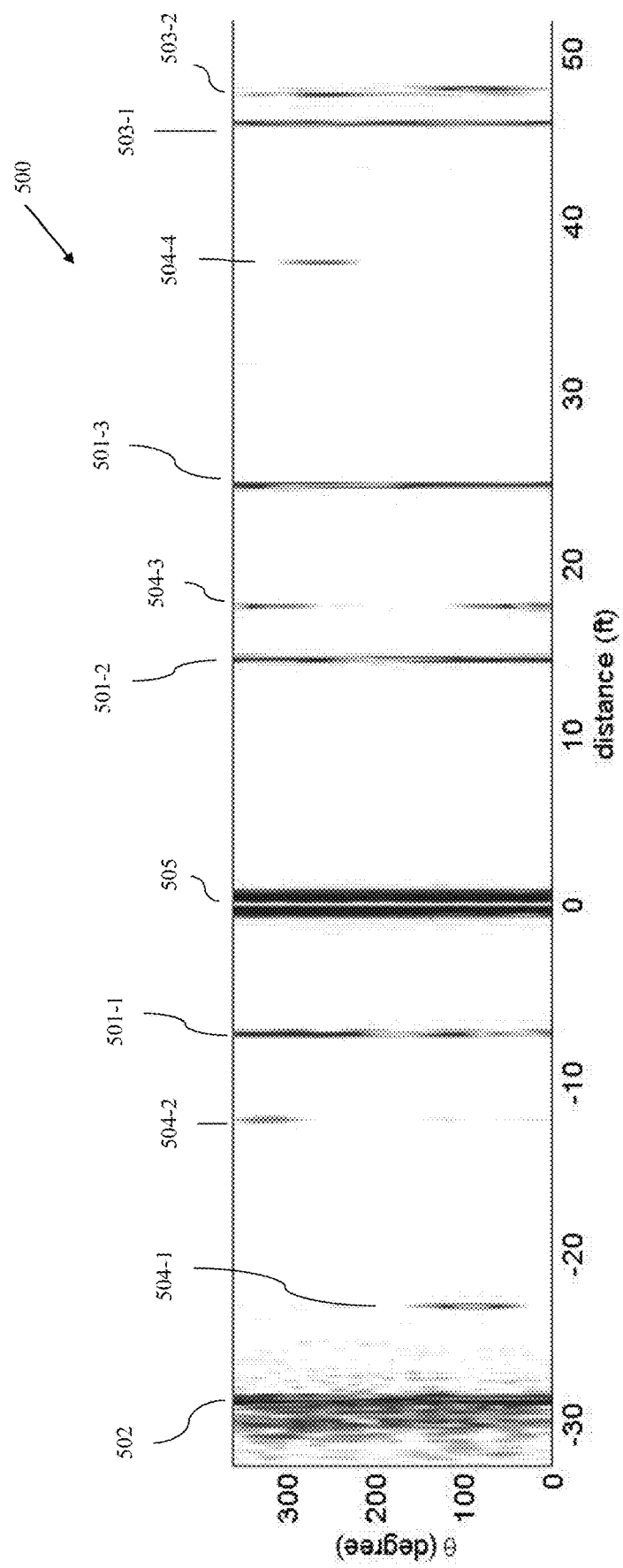
FIG. 5B is one example of a two-dimensional synthetic focusing image of an 80'-long 8" pipe loop generated with the magnetostriction inspection system illustrated in FIGS. 1A and 1B in accordance with some embodiments.

FIGS. 5A and 5B are examples of one embodiment of a one-dimensional "A-scan" and a two-dimensional synthetic focusing scan, respectively, which were generated using a magnetostrictive guided wave pipeline inspection system applied to an 80' length of pipe with simulated corrosion defects and a variety of structural features. The length of 8"-diameter pipe features a flange at the left end and a short-radius welded elbow at the right end. The sensor collar was coupled to the pipe approximately 28' to the right of the flange and 45' left of the elbow. The location of the collar is hereafter referred to as "0 feet", and the convention of negative distances to the left and positive distances to the right relative to the "0 position" is hereafter adopted when referring to said pipe. Girth welds were present at approximately −7', +14', and +24'. Simulated corrosion defects (drilled spherical pits) were present at approximately −23', −12', +17', and +37'.

FIG. 5A illustrates an A-scan 300 collected on the pipe loop described above at a center frequency of 64 kHz. The horizontal axis in FIG. 5A denotes axial distance along the pipe and the vertical axis denotes reflected wave amplitude. The primary line illustrated in FIG. 5A is generated using a method which entails summing the waveforms received by the scanner receiver at all positions, filtering said summed waveform, and enveloping said waveform. The A-scan provides indications of the presence of all anomalies in the pipe. Weld reflections 301-1, 301-2,301-3, flange reflection 302, elbow weld reflections 303-1,303-2, and defect reflections 304-1, 304-2, 304-3, 304-4. Indication 305 at the 0 location is referred to as the "dead zone" of the inspection and is due to saturation of the receiver electronics due to the emitted axisymmetric wave pulse. However, the limited information in the A-scan of FIG. 5A makes it difficult to differentiate the non-critical structural features from the critical corrosion defects. Furthermore, it is impossible to determine the lateral extent of said reflectors, which would provide information that is critically important for distinguishing non-critical structural features from critical defects as well as characterizing the dimensions and severity of said defects.

FIG. 5B illustrates a synthetic focusing scan 500, i.e. "unrolled pipe image" or "C-scan" image, generated from multiple A-scans, such as the one in FIG. 5A. The synthetic focusing algorithms used in connection with systems 100A, 100B advantageously enable graphic 500 to be displayed to a user, which enables the identification of defects, welds, pipe supports, and other pertinent features. The horizontal axis in FIG. 5B denotes axial distance along the pipe and the vertical axis denotes circumferential position around the pipe and is thus configured such that 0° at the lower extreme of said image and 360° at the upper extreme of said image are equivalent. The intensity (darkness) of the synthetic focusing image is representative of the amplitude of the reflections. The indications due to the dead zone and any generally axisymmetric reflectors, including welds 501-1, 501-2, 501-3, flange 502, and the first elbow weld 503-1, have generally uniform amplitude vertically, i.e. around the circumference of the pipe. Alternatively, the non-axisymmetric reflections, including corrosion indications 504-1, 504-2, 504-3, 504-4 and the second elbow weld 503-2, are representative of non-axisymmetric reflectors. Based on the additional information provided by the focused image, the defects are now clearly distinguishable from the non-critical structural features and the circumferential location and extent of said defects can be characterized. The second weld reflection 503-2 in FIG. 5B is non-axisymmetric because the waves travel a shorter path along the intrados of said elbow than the waves propagating along the longer extrados of said elbow. The reflections from the second weld at the intrados and extrados are clearly distinguishable in the synthetic focusing image.

The non-destruction inspection systems and methods described above advantageously provide for the generation and reception of flexural guided wave modes using segmented magnetostrictive sensors for the inspection of hollow cylindrical structures. As a result of this capability, it is possible to distinguish reflections generated by structural features, such as welds, from reflections generated by material defects, such as metal loss. Furthermore, phased-array and synthetic guided wave focusing concepts can be employed using the segmented magnetostrictive sensor to determine the approximate circumferential location and extent of a reflection source thereby providing significantly improved sizing capabilities compared to conventional magnetostrictive sensors. By employing the focusing concepts with the segmented magnetostrictive sensor, improved SNR can be achieved through constructive interference of the wave energy generated and/or received by the individual segments of the sensor and can lead to improved sensitivity and penetration power.

Enhancements on the systems and methods described in U.S. Pat. No. 8,907,665 B2 provide enhanced ease of use, reduced cost, and a significantly extended range of operating temperatures. One limitation of magnetostrictive pipe inspection technologies is the need to ultrasonically couple the magnetostrictive material to the pipe in order to efficiently transmit the ultrasound between the sensor and said pipe. Various coupling methods have been employed including viscous gel couplant, temporary or permanent bonding, and pressure coupling. Each of the techniques has inherent advantages and disadvantages. For example, the utilization of viscous gel coupling is relatively quick and allows the magnetostrictive material to be reused many times, but it typically yields reduced signal-to-noise ratio (SNR) and is generally limited to pipe temperatures between 40° F. and 100° F. due to the strong dependence of its viscosity on temperature. In another example, bonding of the magnetostrictive material to the structure can provide improved SNR, but it requires more preparation time, may result in an inability to reuse the magnetostrictive material for another test location, and is also limited by pipe surface temperature based on the temperature limitations of the bonding compound. Pressure coupling utilizes normal pressure (perpendicular to the pipe surface) to mechanically couple the magnetostrictive material to the structure. Pressure coupling is applicable over a much wider range of pipe temperatures, but requires a mechanism for applying said pressure coupling without disrupting the functionality of the magnetostrictive material or sensor system. The temperature limitation of the pressure-coupled device is primarily limited by the temperature limitations of the system components and not the coupling mechanism itself. In the preferred embodiment, the disclosed system can be deployed on pipes having surface temperatures in excess of 600° F.

Figure 6A:
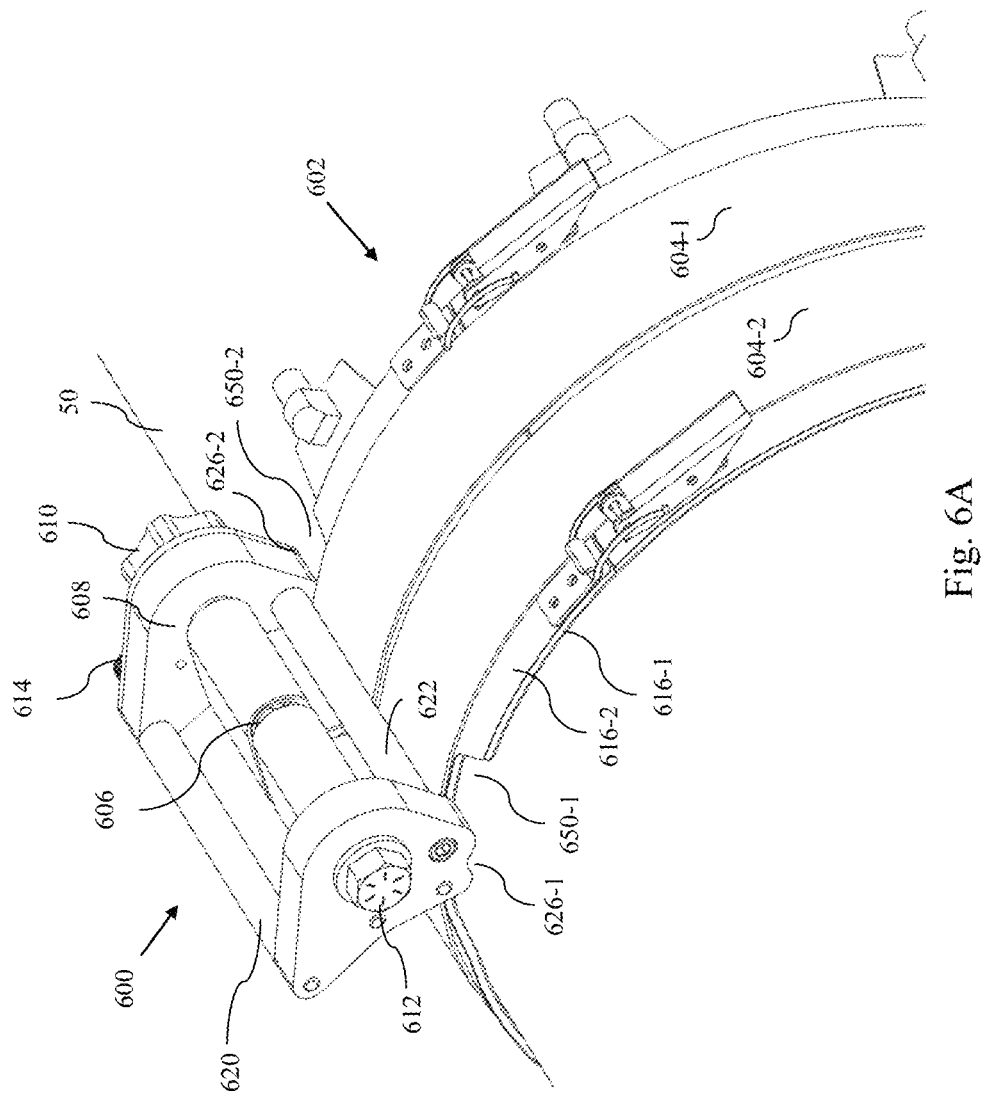
FIG. 6A illustrates one example of a magnetostrictive inspection system installed on and coupled to a pipe by means of a strap tensioner mechanism in accordance with some embodiments.

In some embodiments, the disclosed invention utilizes mechanical pressure to achieve ultrasonic coupling between the magnetostrictive material 102 and the test object 50 by use of a strap tensioner device 600 that is applied over at least said magnetostrictive material, and in some embodiments, other components of the collar 602, such as at least one inner jacket 616-1 and at least one outer jacket 616-2, as illustrated in FIG. 6A. Said tensioner utilizes at least one strap 604 of material that is located external to said magnetostrictive material and tensioned by means of a slotted drum 606, through which the at least one end of at least one strap is fed and around which it is subsequently wound, and an internal ratchet mechanism 608, best seen in FIG. 6C, that prevents the drum from rotating backward during tensioning. The forward rotation of the drum 606 to apply tension to the strap is achieved by means of at least one of a thumbwheel 610 or a bolt 612 to which a wrench, handle, or similar device may be attached. The tensioning of the strap over the magnetostrictive material applies mechanical pressure that facilitates ultrasonic coupling between said magnetostrictive material and the test object 50. The strap tension may be released by means of a ratchet release lever 614 shown in FIG. 6C. Ratchet release lever 614 includes a body having at least one tip 614a that is designed to engage the teeth 608a of ratchet wheel 608. A spring or other biasing member 615 may be arranged to apply a force to ratchet release lever 614 to assist in disengaging the tip 614a from voice between adjacent teeth 608a of ratchet wheel 608. In some embodiments, said tensioner 600 further comprises a handle 620 to aid in tightening the device.

In some embodiments, tensioner 600 is configured to straddle collar 602 and further comprises at least one set of feet 626 that contact pipe or test object 50. Said feet 626 may be configured to fall within at least one cut-out area 650 in collar 602. One embodiment of the tensioner device is illustrated without the straps in FIG. 6B.

Figure 6B:
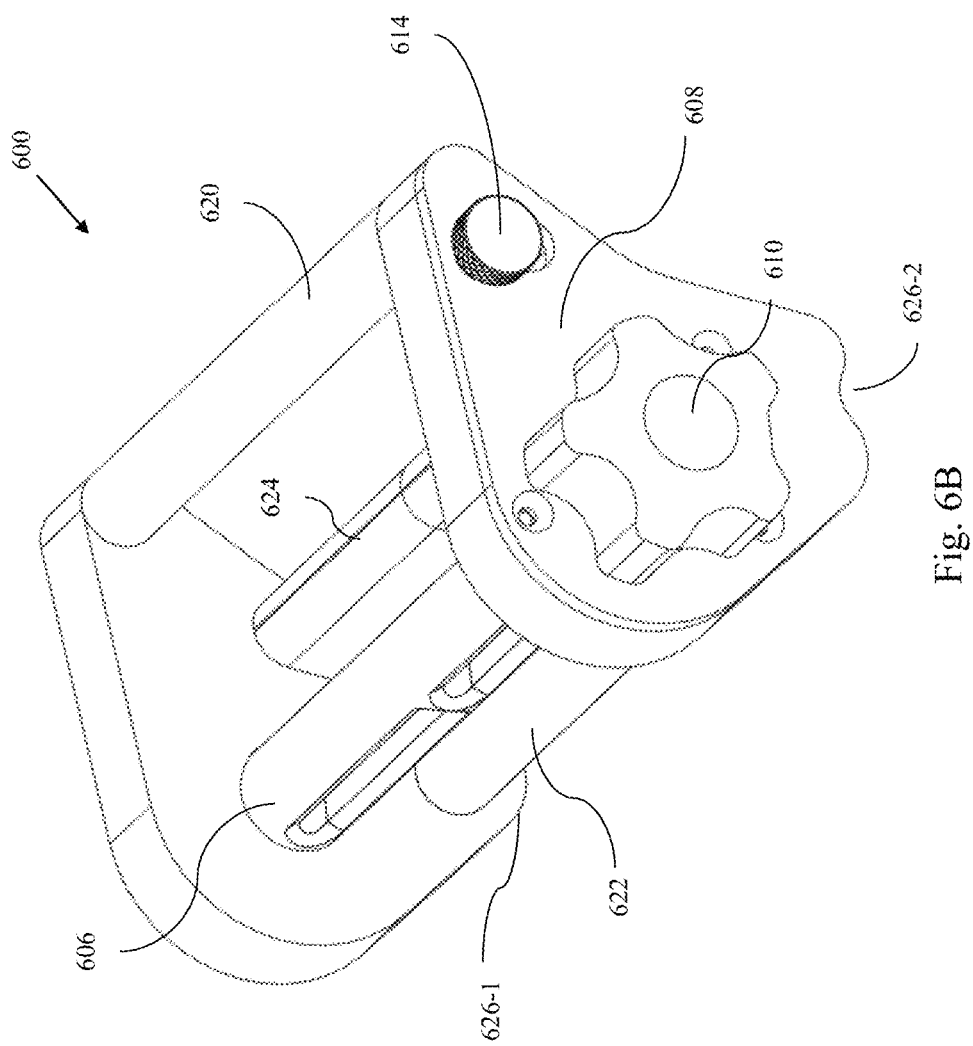
FIG. 6B illustrates one example of a tensioner mechanism used in conjunction with a magnetostrictive inspection system in accordance with some embodiments.
Figure 6C:
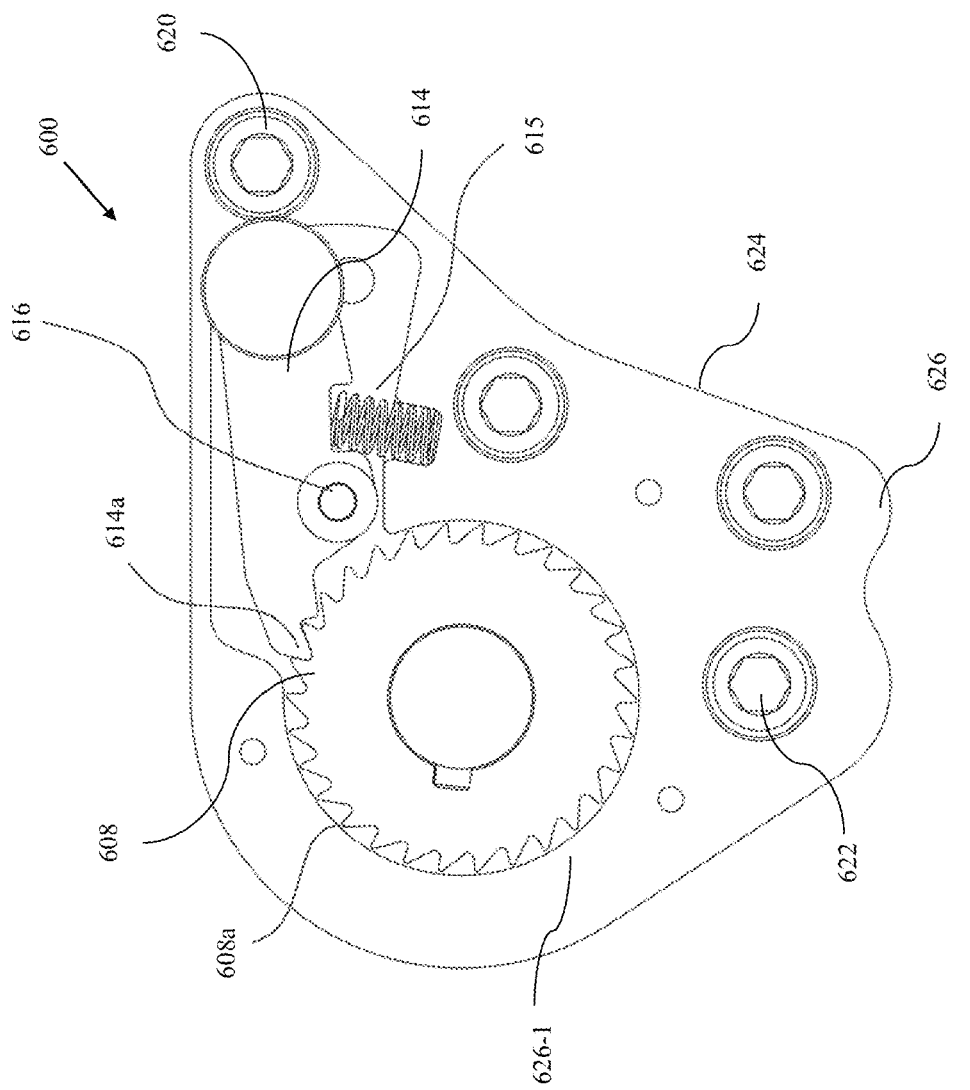
FIG. 6C illustrates a view of some of the internal components of one example of a strap tensioner mechanism in accordance with some embodiments.

As best seen in FIG. 6B, the bar 622 at the bottom of the tensioner device 600, which redirects a first end of the straps 604 into the slotted drum 606, is spaced as closely (circumferentially) as possible to the back panel 624 in order to maximize the percentage of the circumference of the pipe upon which the tensioner pressure is applied. A second end of straps 604 is fed up around back panel 624 and into a retention mechanism (not shown).

In some embodiments, the at least one strap 604 is composed of a material that has both high tensile strength and high temperature resistance, such as a metallic strap or those composed of fibers of one or more types of aromatic polyamides ("aramids"), including but not limited to fibers marketed under the trade names Kevlar, Nomex, Technora, and Twaron to list only a few possibilities.

To further enhance the distribution of tensioner pressure around the circumference of the test object 50, as well as to protect the coil circuits 106, some embodiments of the sensor collar 602 include a jacket assembly 616. The jacket assembly 616 can be formed or designed to provide a rigidity that redistributes the tensioner pressure more evenly around the circumference of test object 50 and along the (axial) width of the collar 602, such that minor misalignments in the strap 604 around the circumference of test object 50 will result in negligible variation in coupling pressure between the magnetostrictive material 102 and test object 50. Furthermore, the rigidity of the jacket assembly 616 can be selected such that the jacket assembly 616 sufficiently redistributes the coupling pressure such that there is no inactive area beneath the tensioner mechanism 600 in which ultrasonic coupling is insufficient; this results in enhanced SNR, axisymmetry of the generated wave, and improved capability to detect reflected waves.

Figure 7A:
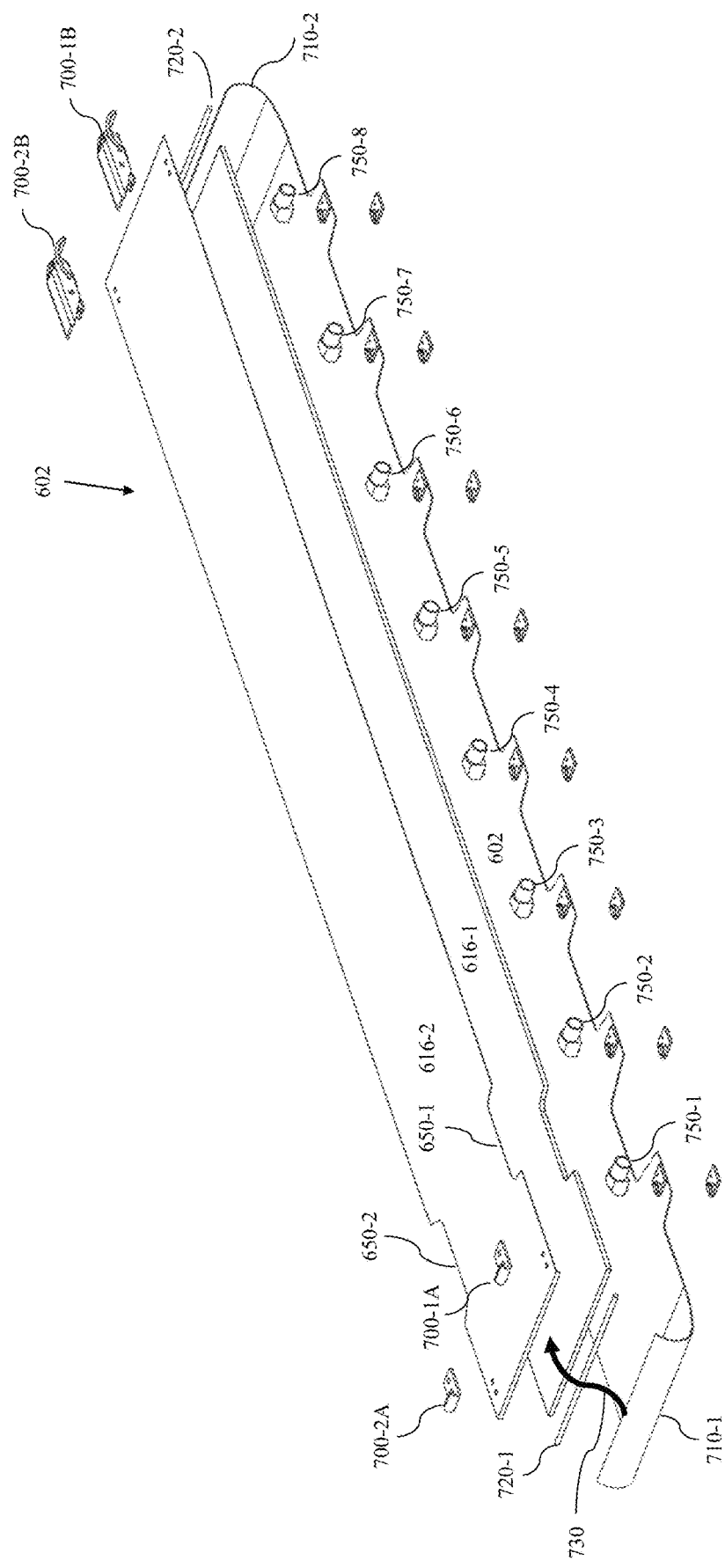
FIG. 7A illustrates an exploded view of one example of a magnetostrictive inspection system in accordance with some embodiments.

In some embodiments, the rigid jacket comprises at least one inner jacket 616-1, constructed of one or more relatively soft materials, such as silicone rubber, and at least one outer jacket 616-2, constructed of one or more relatively stiff materials, such as stainless steel as shown in FIG. 7A. The combination described here provides for an effective distribution of tensioner pressure across the magnetostrictive material 102 and protects the coil circuits 106 from damage during tensioning. In said embodiment, the outer jacket 616-2 also serves to reduce the friction between the tensioner straps 604 and the jacket 616 to minimize the force required to adequately tension the device. In some embodiments, an additional layer of material (not shown), such as PTFE, is included between the straps 604 and the outer jacket 616-2 to further reduce friction. Said jacket 616 may also be pre-curled to more easily conform to the diameter of pipe 50, for which it is designed. Furthermore, the inner silicone rubber jacket 616-1 in said embodiment is of a sufficient thickness such that the outer stainless-steel jacket 616-2 does not interfere with the magnetic fields generated and detected by the sensor coils 106. The presence of a conductive material in close proximity to said sensor coils can disrupt their ability to effectively generate and detect ultrasonic guided wave energy by means of magnetostrictive transduction. In one example, a silicone rubber thickness between 0.125" and 0.375" is sufficient for this purpose.

Figure 7B:
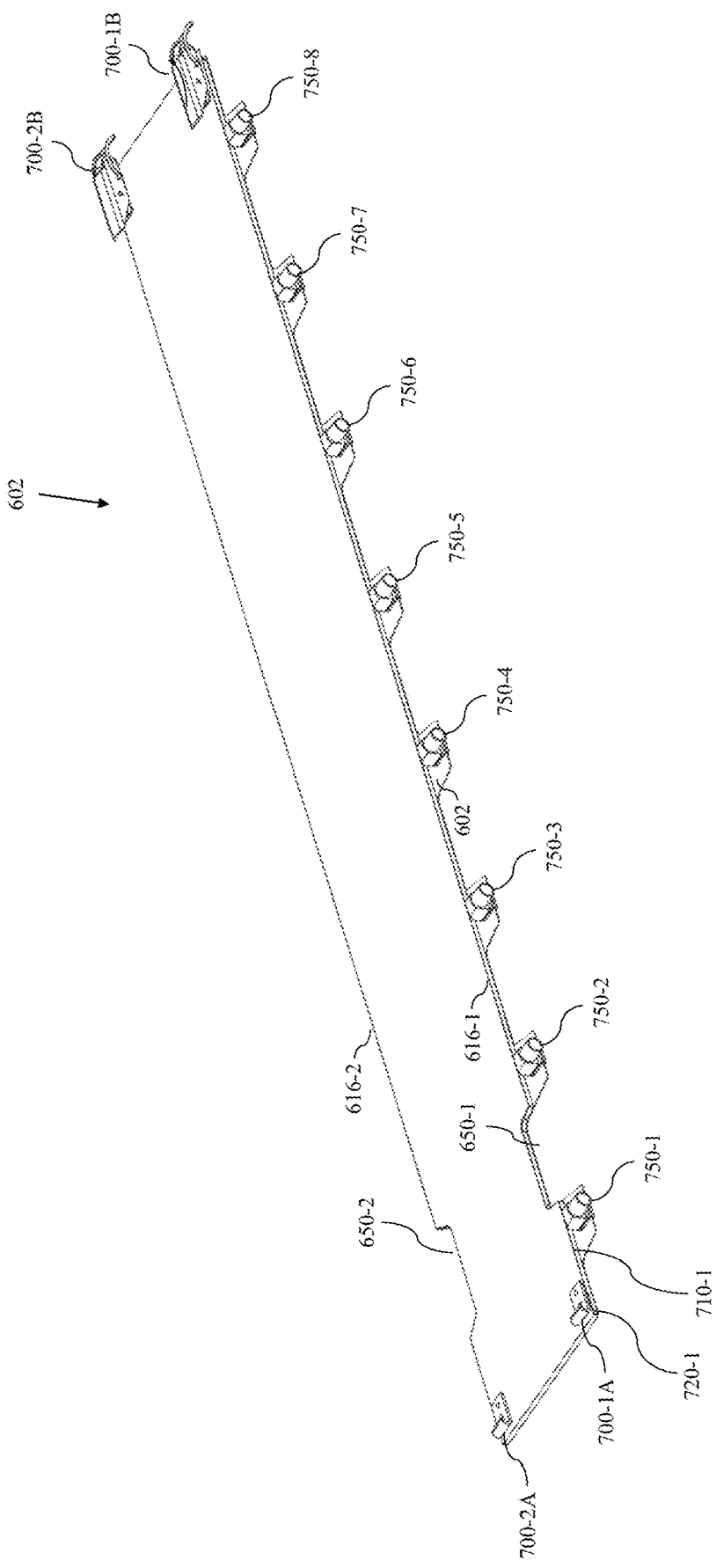
FIG. 7B illustrates an isometric view of one example of a magnetostrictive inspection system in accordance with some embodiments.

FIG. 7A illustrates an exploded view of one embodiment, and FIG. 7B illustrates a conventional view of the same embodiment, in which sensor coil circuits 106 are attached to jacket 616 by means of at least one of adhesives or mechanical fasteners. Extensions 710, which may be constructed of polyimide or another material, are attached to sensor coils 106 by means of adhesive to form an extended coil assembly. The extended coil assembly is wrapped around a rigid, small-diameter rod 720 at each end, and folded back such that it is sandwiched between the inner jacket 616-1 and outer jacket 616-2 components, as illustrated by arrow 730 in FIG. 7A. Additional mechanical fasteners, including but not limited to rivets, may be used to further fasten the coil assembly 106 to the jacket assembly 616.

FIG. 7C illustrates a closer view of the joint between coil circuit 106, extension 710, rod 720, inner jacket 616-1, and outer jacket 616-2. In some embodiments, the end of outer jacket 616-2 is folded around the end of the assembly.

In some embodiments, coil circuit 106 may be connected to at least one outer jacket 616-2 over some portion of its length for additional stability.

FIGS. 7A and 7B further illustrate an example in which one or more connectors 750 are configured to provide electrical connection between the pulse generator 132 and at least one of sensor coils 106 as well as between the amplifier 134 and at least one of sensor coils 106. In some embodiments, said connectors are attached to the sensor coil assembly 106 in a manner that provides sufficient articulation such that they do not interfere with and are not damaged by installing the collar on a pipe. Said connectors may be distributed along the length of coil assembly 106 or grouped into one or more connectors at a single location along the length of said assembly.

In some embodiments, as illustrated in FIGS. 7A and 7B, mechanical over-center latches 700-1A and 700-2A and corresponding catches 700-1B and 700-2B are attached to collar 602 to fasten the ends of said collar together when placed on test object 50. In some embodiments, said fasteners serve the purpose of holding collar 602 on test object 50 independently of the tensioner 600 for improved ease-of-use.

Figure 7E:
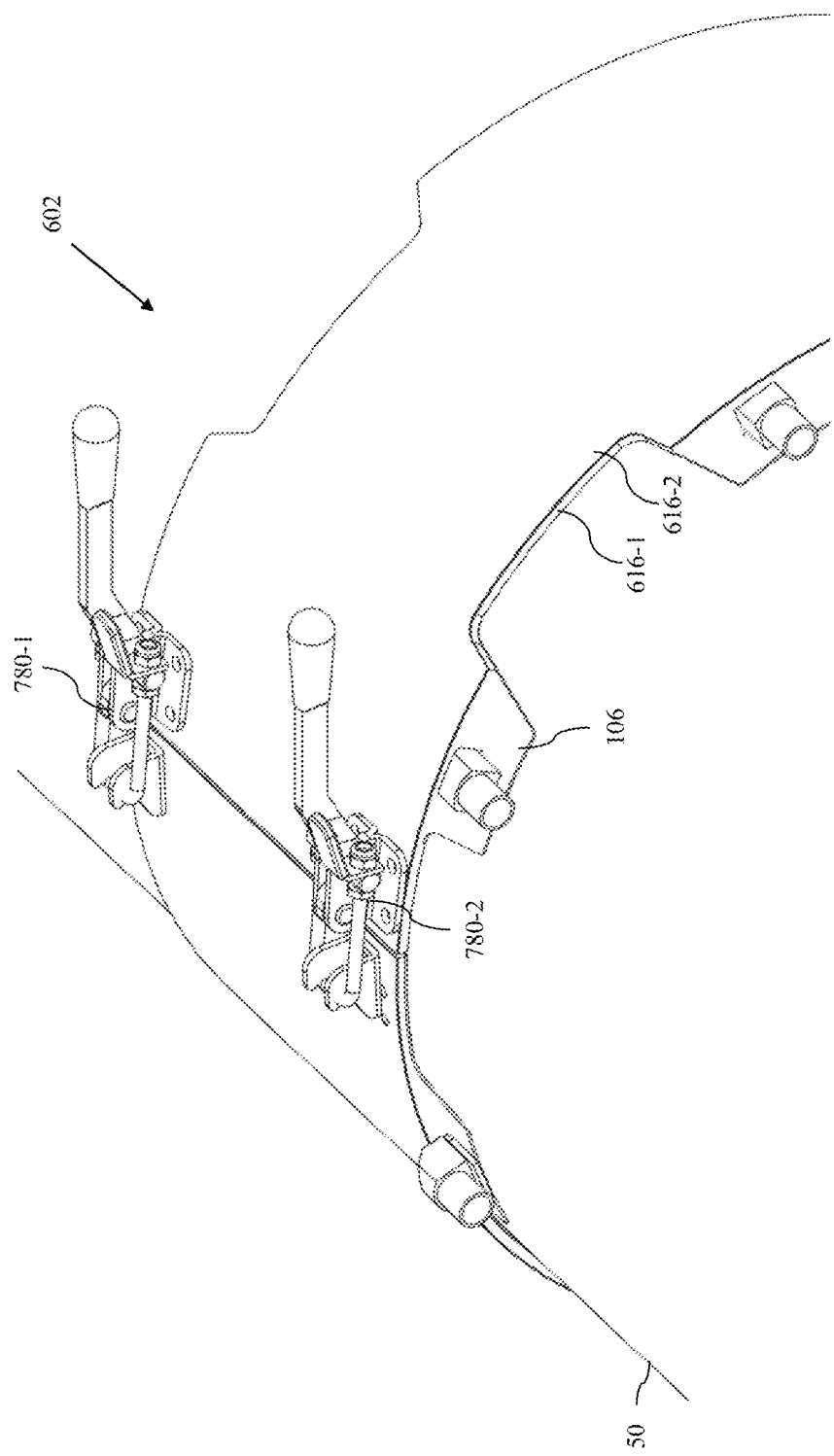
FIG. 7E illustrates one example of a magnetostrictive inspection system in which coupling pressure is applied by means of at least one over-center or under-center mechanism in accordance with some embodiments.

FIGS. 7D and 7E illustrate additional embodiments, in which said fasteners further serve the purpose of applying tension to collar 602 without the need for strap tensioner 600. Various types of fasteners and various means of applying sufficient tension in this manner will be obvious to those of ordinary skill in the art and include but are not limited to threaded fasteners 770 (i.e., fasteners 770-1 and 770-2) shown in FIG. 7D and over-center mechanisms 780 (i.e., over-center mechanisms 780-1, 780-2) shown in FIG. 7E. In some embodiments, said fasteners 770-1, 770-2, 780-1, 780-2 are connected to at least one outer jacket 616-2.

In some configurations, the magnetostrictive material 102 is attached to the surface of the coil circuit 106 that lies closest to the test object 50. The magnetostrictive material 102 may be attached by means of adhesive, tape, mechanical fasteners, or comparable joining methods that will be obvious to those of ordinary skill in the art. It is advantageous for said magnetostrictive material to be removable and replaceable such that if it is damaged during use, it may be replaced with minimal effort and cost.

In additional configurations, said magnetostrictive material is not attached to the collar assembly 602, but is located between said collar 602 and test object 50 during installation and data collection such that it is properly aligned with the sensor coils 142. In such a configuration, coupling may be achieved by means of gel couplant, bonding, or similar coupling methods, or by means of mechanical pressure.

In some embodiments, the components are comprised of materials such that the collar may withstand pipe surface temperatures of −40° F. or less to 600° F. or greater. In some embodiments, sensor coil circuits 106 are fabricated using high-temperature flexible circuit material systems capable of operating intermittently or continuously over such a temperature range, said material systems and fabrication methods including, but not limited to, the DuPont Pyralux HT adhesiveless flexible circuit system to list only a few possible examples.

Figure 8A:
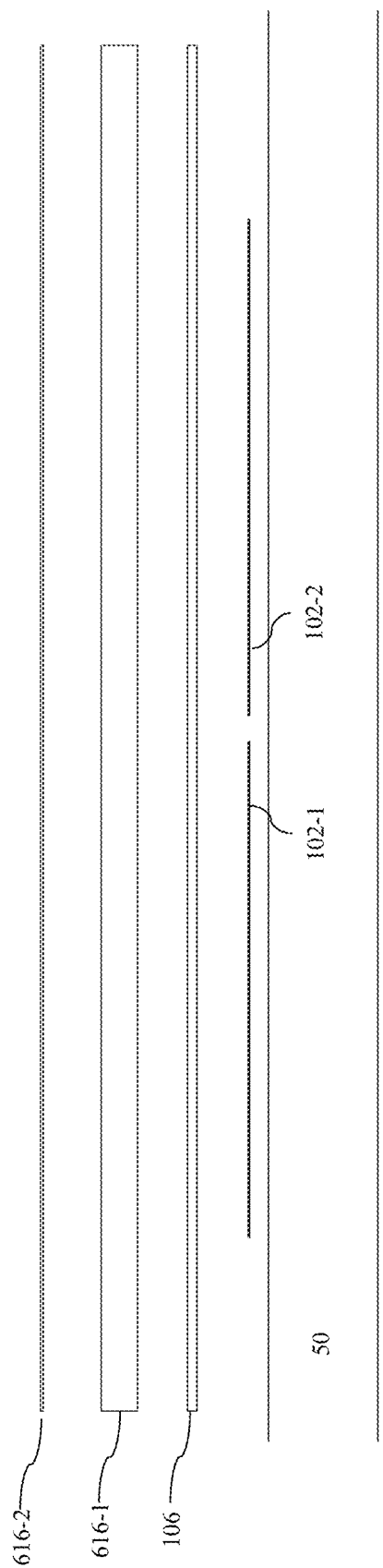
FIG. 8A is a layer view of a first example of a magnetostrictive inspection system in accordance with some embodiments.

FIG. 8A illustrates an exploded layer view of one embodiment. As shown in FIG. 8A, magnetostrictive material 102-1, 102-2 is placed in direct contact with a surface of test object 50. A sensor coil circuit 106 is place in contact with magnetostrictive material 102 and covered by a jacket 616, which may comprise an inner jacket 616-1 and an outer jacket 616-2.

Figure 8B:
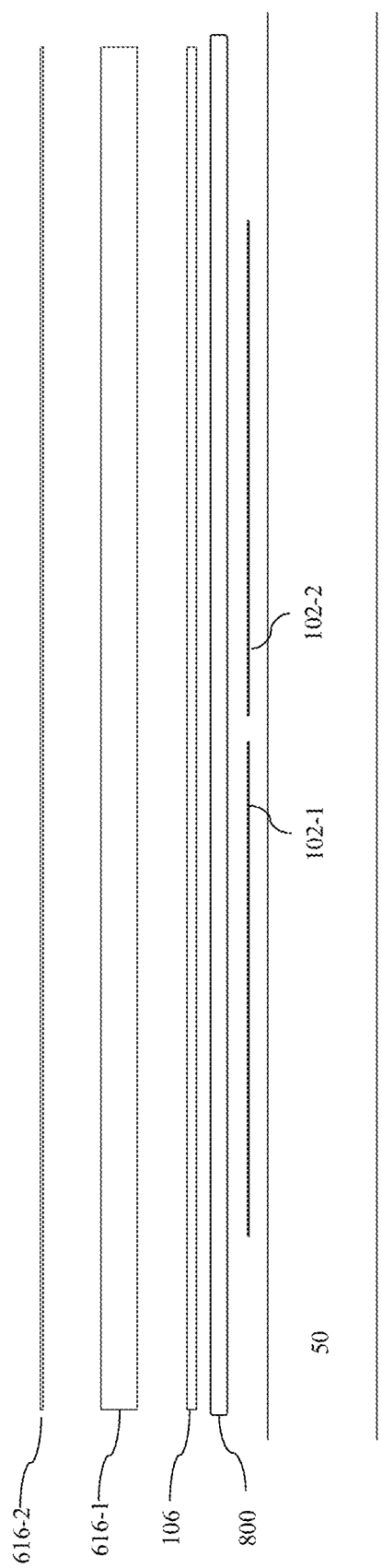
FIG. 8B is a layer view of a second example of a magnetostrictive inspection system in accordance with some embodiments.

FIG. 8B illustrates an exploded layer view of another embodiment. As shown in FIG. 8B, an insulating layer 800 is included between magnetostrictive material 102 and sensor coil circuit(s) 106 to reduce the temperatures to which said coil circuit(s) are exposed during operation on a high-temperature or low-temperature test object 50. Said insulating layer may be comprised of high-performance, flexible, insulating materials including aerogel-fiber-based materials including, but not limited to, those marketed under the trade name Pyrogel XT. The thickness of said insulating layer 800 may be minimized in order to reduce the lift-off separation between sensor coil circuit(s) 106 and the magnetostrictive material 102, which can reduce the SNR of the system. Such configurations can extend the maximum operating temperature of the collar as high as 1000° F. or more.

Figure 8C:
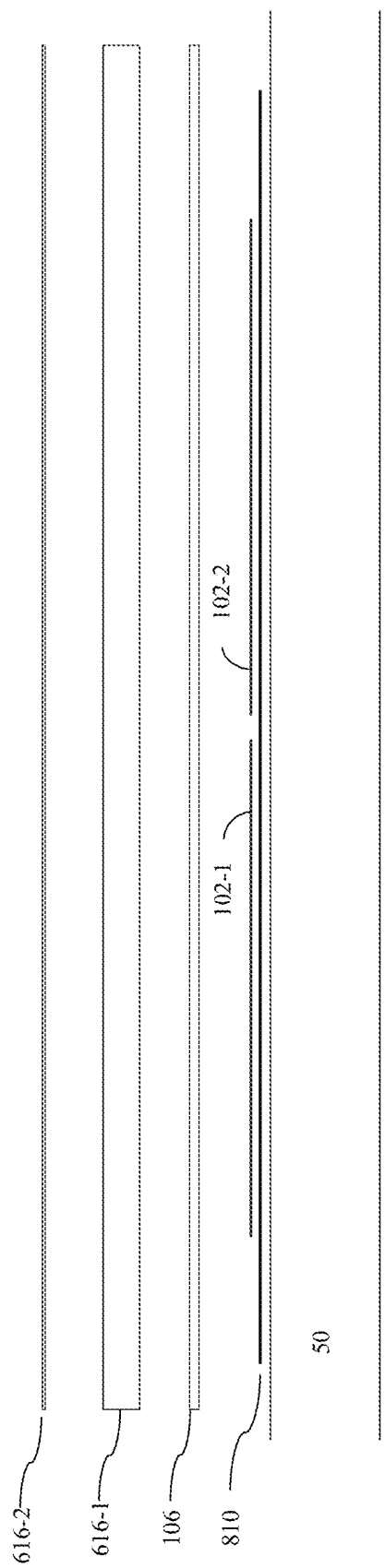
FIG. 8C is a layer view of a third example of a magnetostrictive inspection system in accordance with some embodiments.

FIG. 8C illustrates an exploded layer view of yet another embodiment. In the embodiment shown in FIG. 8C, at least one thin layer of aluminum (or other metal) foil 810 is included between magnetostrictive material 102 and test object 50 for the purpose of improving ultrasonic coupling between said magnetostrictive material 102 and said test object.

Although the invention has been described in terms of exemplary embodiments, it is not limited thereto. Rather, the appended claims should be construed broadly, to include other variants and embodiments of the invention, which may be made by those of ordinary skill in the art without departing from the scope and range of equivalents of the invention.

What is claimed is:

1. A system for non-destructive inspection of a structure, comprising:
    at least one magnetostrictive strip configured to be induced with a bias magnetic field and wrapped at least partially around an outer surface of said structure;
    a plurality of coil circuits configured to be disposed adjacent to said at least one magnetostrictive strip;
    a jacket having at least one component layer configured to be disposed adjacent to at least one of the plurality of coil circuits; and
    a tensioner coupled to the jacket and configured to provide a mechanical pressure coupling between said at least one magnetostrictive strip and said structure by tensioning the jacket,
    wherein said at least one of the plurality of coil circuits is individually controllable by a number of channels to at least one of excite or detect guided waves in said structure.

2. The system of claim 1, wherein each of said plurality of coil circuits is individually controllable by a number of channels to at least one of excite or detect guided waves in said structure using at least one of active phased-array focusing or synthetic phased-array focusing of the guided waves.

3. The system of claim 1, wherein the tensioner includes at least one mechanical fastener attached to said jacket for providing the mechanical pressure coupling.

4. The system of claim 3, wherein said at least one mechanical fastener includes a threaded fastener.

5. The system of claim 3, wherein said at least one mechanical fastener includes an over-center or under-center mechanism.

6. The system of claim 1, further comprising at least one strap configured to be disposed adjacent to said jacket and tensioned by the tensioner.

7. The system of claim 6, further comprising at least one mechanical fastener to secure ends of said at least one component layer around said structure.

8. The system of claim 6, wherein said tensioner includes:
    a drum configured to capture at least one end of said straps and be rotated about an axis,
    a means for rotating said drum to tension said straps, and
    a ratchet configured to retain strap tension during tensioning,
    wherein said tensioner is configured to straddle said at least one magnetostrictive strip.

9. The system of claim 6, wherein said at least one strap includes one of an aramid fiber material or a metal.

10. The system of claim 1, wherein said plurality of coil circuits are fabricated from materials able to withstand temperatures of at least 500° F.

11. The system of claim 1, wherein said plurality of coil circuits are components of a plurality of flexible circuit boards each having two layers of conductive signal traces.

12. The system of claim 1, wherein said plurality of coil circuits are components of at least one flexible circuit board having at least two layers of conductive signal traces.

13. The system of claim 1, wherein said jacket comprises at least one first jacket member and at least one second jacket member, the at least one first jacket member being less rigid than the at least one second jacket member.

14. The system of claim 13, wherein the at least one first jacket member includes silicone rubber.

15. The system of claim 13, wherein the at least one second jacket member includes stainless steel.

16. The system of claim 1, wherein said plurality of coil circuits are configured such that a respective end of each of at least two of said plurality of coil circuits wrap around at least one component layer of the jacket.

17. The system of claim 1, further comprising a thermally-insulating material configured to be disposed between said plurality of coil circuits and said at least one magnetostrictive strip.

18. A method of using the system for non-destructive inspection of the structure of claim 1, the method comprising:
    placing the at least one magnetostrictive strip on the outer surface of the structure;
    positioning the plurality of coil circuits adjacent to the at least one magnetostrictive strip;
    placing the jacket around the plurality of coil circuits and the at least one magnetostrictive strip; and
    applying mechanical pressure to the at least one magnetostrictive strip using the tensioner coupled to the jacket to at least temporarily secure the plurality of coil circuits and the magnetostrictive strip to the structure.

19. The method of claim 18, wherein said plurality of coil circuits are, at least temporarily, attached over some portion of their length to said jacket.

20. The method of claim 18, wherein said at least one magnetostrictive strip is, at least temporarily, attached to at least one of the plurality of coil circuits or the jacket to ensure proper alignment with said circuits.

21. A system for non-destructive inspection of a structure,
at least one magnetostrictive strip configured to be induced with a bias magnetic field and wrapped at least partially around an outer surface of said structure;
a plurality of coil circuits configured to be disposed adjacent to said at least one magnetostrictive strip;
a jacket having at least one component layer configured to be disposed adjacent to at least one of the plurality of coil circuits;
at least one strap configured to be disposed adjacent to said jacket; and
a tensioner configured to provide a mechanical pressure coupling between said at least one magnetostrictive strip and said structure, the tensioner configured to straddle said at least wherein the tensioner includes:
  a drum configured to capture at least one end of said at least one strap and be rotated about an axis,
  a means for rotating said drum to tension said at least one strap, and
  a ratchet configured to retain strap tension during tensioning,
wherein said at least one of the plurality of coil circuits is individually controllable by a number of channels to at least one of excite or detect guided waves in said structure.

* * * * *